United States Patent
Schulz et al.

(10) Patent No.: US 9,733,797 B2
(45) Date of Patent: Aug. 15, 2017

(54) RADIO SYSTEM FOR LONG-RANGE HIGH SPEED WIRELESS COMMUNICATION

(71) Applicant: Ubiquiti Networks, Inc., San Jose, CA (US)

(72) Inventors: Gary Schulz, Barrington, IL (US); John Sanford, Escondido, CA (US); Lance Lascari, Barrington, IL (US); Christopher Fay, Barrington, IL (US); Richard Keniuk, Barrington, IL (US); Jude Lee, San Jose, CA (US); Charles Macenski, Barrington, IL (US)

(73) Assignee: UBIQUITI NETWORKS, INC., San Jose, CA (US)

( * ) Notice: Subject to any disclaimer, the term of this patent is extended or adjusted under 35 U.S.C. 154(b) by 495 days.

(21) Appl. No.: 14/177,117

(22) Filed: Feb. 10, 2014

(65) Prior Publication Data
US 2014/0225788 A1     Aug. 14, 2014

Related U.S. Application Data

(60) Provisional application No. 61/762,814, filed on Feb. 8, 2013.

(51) Int. Cl.
*H01Q 1/24* (2006.01)
*G06F 3/0482* (2013.01)
(Continued)

(52) U.S. Cl.
CPC ......... *G06F 3/0482* (2013.01); *H01Q 1/1228* (2013.01); *H01Q 15/147* (2013.01);
(Continued)

(58) Field of Classification Search
CPC ............... H01Q 1/52; H01Q 1/42; H01Q 1/12
(Continued)

(56) References Cited

U.S. PATENT DOCUMENTS

| 6,429,827 B1 | 8/2002 | Hsueh et al. |
| 2002/0113744 A1 | 8/2002 | Strickland |

(Continued)

FOREIGN PATENT DOCUMENTS

| CN | 102752000 | * 10/2012 | ............... H04B 1/04 |
| KR | 2002/0095556 A | 12/2002 | |
| WO | 03/023987 A1 | 3/2003 | |

*Primary Examiner* — Graham Smith
*Assistant Examiner* — Jae Kim
(74) *Attorney, Agent, or Firm* — Shun Yao; Park, Vaughan, Fleming & Dowler LLP

(57) ABSTRACT

One embodiment of the present invention provides a radio assembly. The radio assembly includes an antenna housing unit that houses a pair of reflectors which are situated on a front side of the antenna housing unit, a printed circuit board (PCB) that includes at least a transmitter and a receiver, and a backside cover. The PCB is situated within a cavity at a backside of the antenna housing unit and the backside cover covers the cavity, thereby enclosing the PCB within the antenna housing unit. One embodiment of the present invention provides a user interface for configuring a radio. The user interface includes a display and a number of selectable tabs presented on the display. A selection of a respective tab results in a number of user-editable fields being displayed, thereby facilitating a user in configuring and monitoring operations of the radio.

20 Claims, 36 Drawing Sheets

Sealant stays within the hatched area before and after the radome is seated

(51) Int. Cl.
    *H01Q 1/12*   (2006.01)
    *H01Q 15/14*  (2006.01)
    *H01Q 19/19*  (2006.01)
    *H01Q 21/28*  (2006.01)

(52) U.S. Cl.
    CPC ........... *H01Q 19/193* (2013.01); *H01Q 21/28* (2013.01); *Y10T 29/49016* (2015.01)

(58) Field of Classification Search
    USPC ................................ 343/702, 841, 872, 878
    See application file for complete search history.

(56) References Cited

U.S. PATENT DOCUMENTS

| | | | |
|---|---|---|---|
| 2003/0071762 A1* | 4/2003 | Tulloch | H01Q 1/1257 343/882 |
| 2007/0057860 A1* | 3/2007 | Jaffer | H01Q 1/125 343/779 |
| 2010/0309966 A1 | 12/2010 | Pera et al. | |
| 2012/0256796 A1* | 10/2012 | Leiba | H01Q 1/2283 343/702 |

* cited by examiner

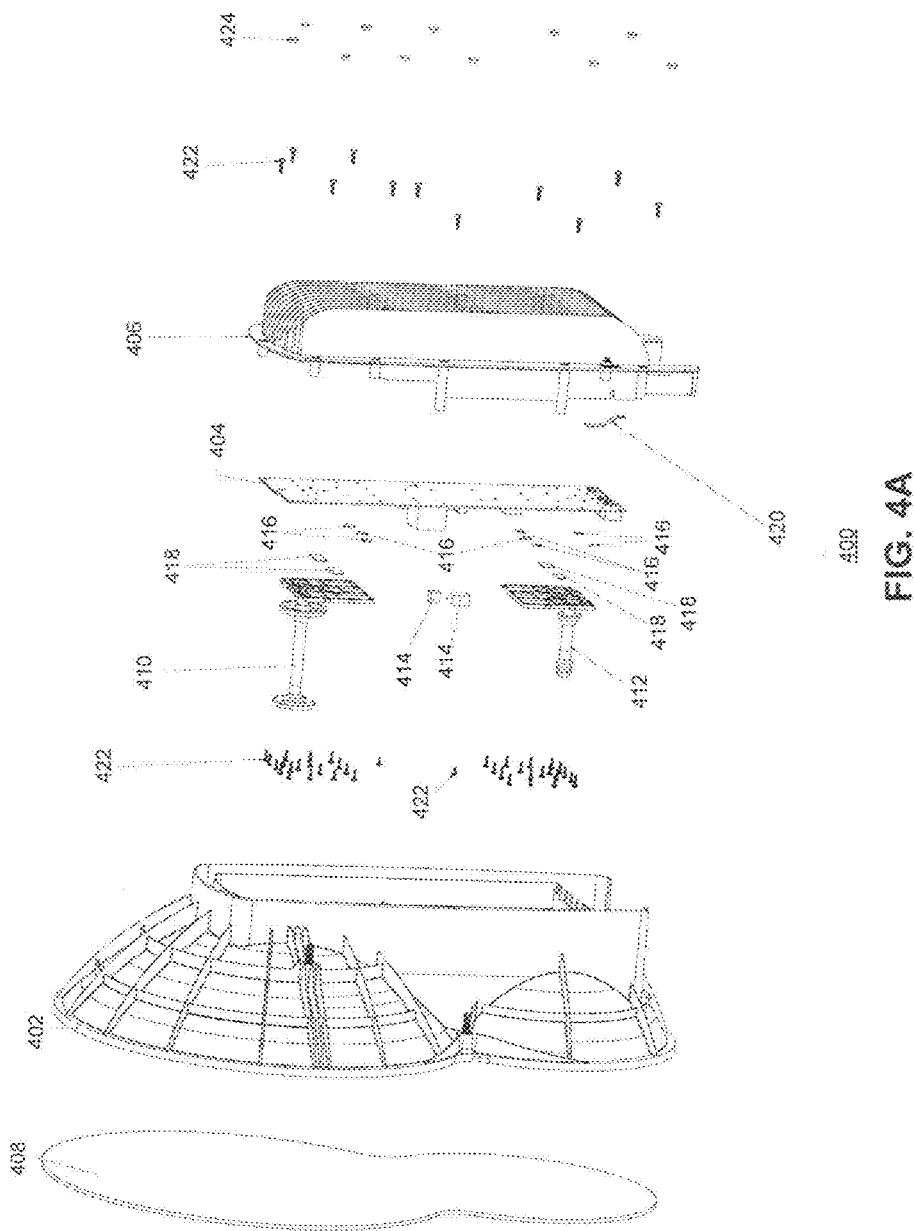

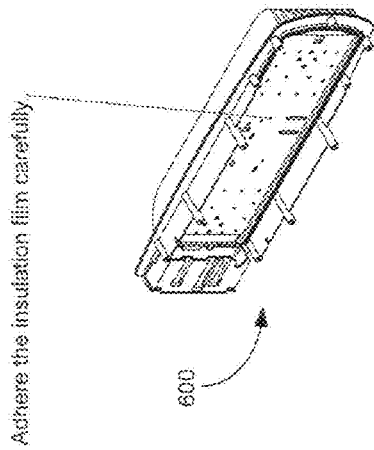
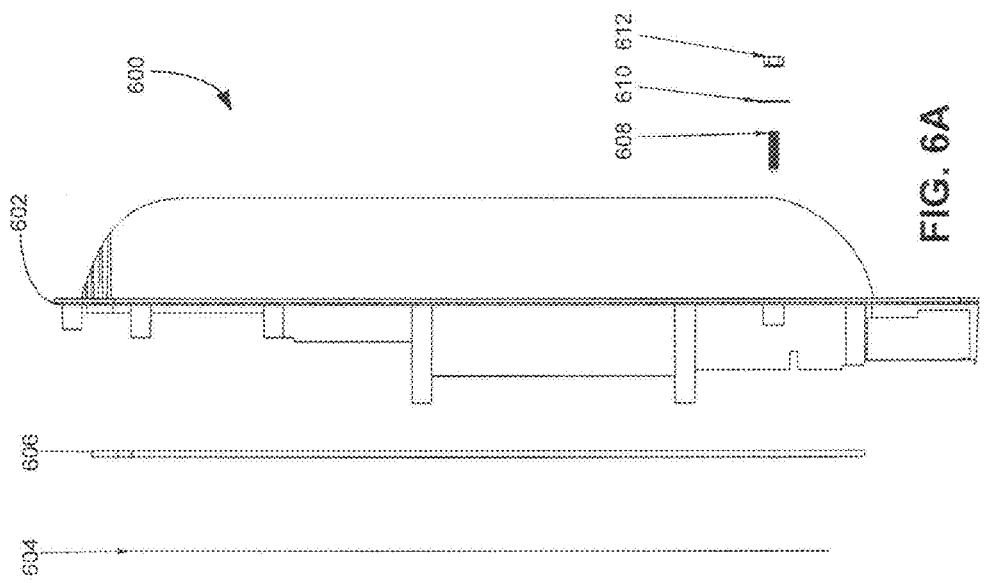
FIG. 6B
FIG. 6A

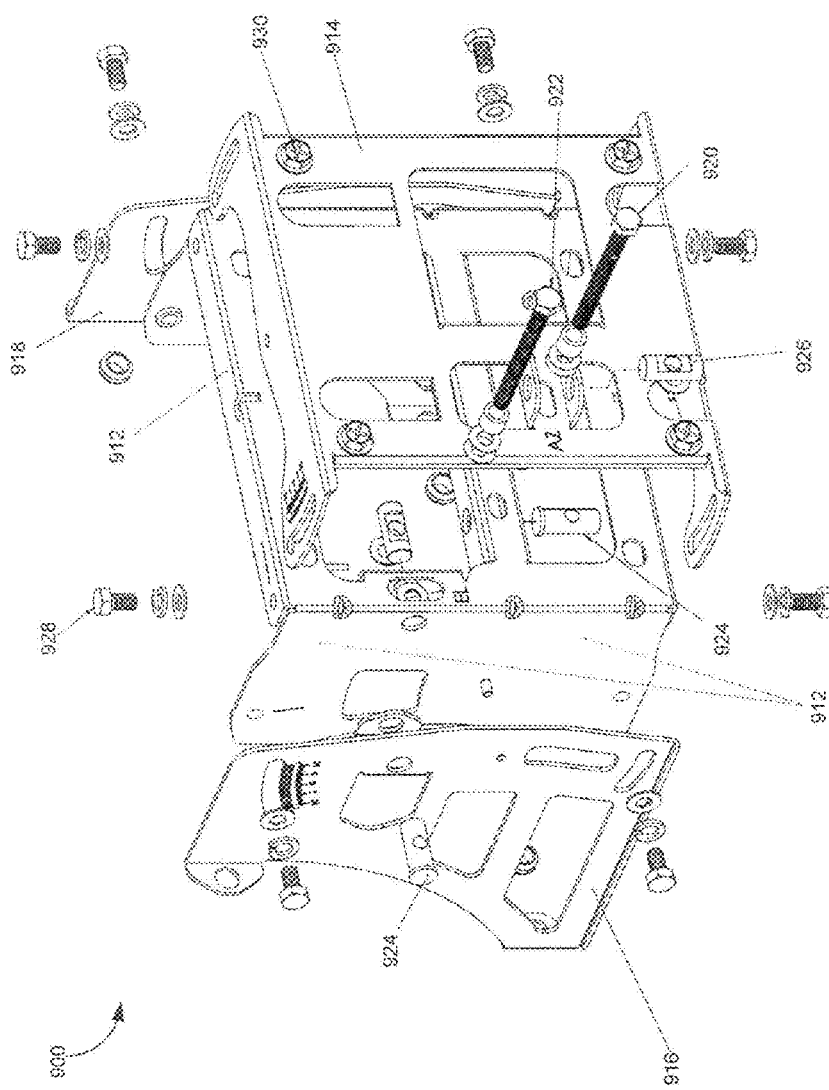

FIG. 17

*Receive Sensitivity Specs*

| Modulation | Sensitivity | FDD Capacity* | TDD Capacity* |
|---|---|---|---|
| 64QAM | -66 dBm | 1500 Mbps | 760 Mbps |
| 16QAM | -72 dBm | 1000 Mbps | 507 Mbps |
| QPSK MIMO | -78 dBm | 500 Mbps | 253 Mbps |
| QPSK SISO | -80 dBm | 250 Mbps | 127 Mbps |
| ½xQPSK MIMO | -87 dBm | 62.5 Mbps | 31.7 Mbps |

FDD* = (2) 100 MHz channel and TDD = (1) 100 MHz channel

FIG. 20

| | |
|---|---|
| Operation Frequency | 24.05-24.25 GHz |
| Dimensions | 649 x 426 x 303 mm |
| Weight | 10.5 kg (Mount included) |
| Max. Power Consumption | < 50 W |
| Power Supply | 50v, 1.2A PoE GigE Adapter (included) |
| Power Method | Passive Power over Ethernet (42-58VDC) |
| Certifications | CE, FCC, IC |
| Mounting | Pole Mount Kit (Included) |
| Operating Temperature | -40 to 55°C (-40 to 131°F) |
| LEDs | (8) Status LEDs: Data Port Speed<br>Data Port Link/Activity<br>Configuration Port Speed<br>Configuration Port Link/Activity<br>GPS synchronization<br>Modulation Mode<br>Master/Slave<br>RF Status<br>(1) Two-Digit LED Display Calibrated in dBm |
| Interface | |
| Data Port | (1) 10/100/1000 Ethernet Port |
| Configuration Port | (1) 10/100 Ethernet Port |
| Auxiliary Port | (1) RJ-12, Alignment Tone Port |
| System | |
| Maximum Throughput | 1.4 + Gbps |
| Maximum Range | 13+ km |
| Packets per Second | > 1 Million |
| Encryption | 128-bit AES |
| Forward Error Correction | 164/205 |
| Cyclic Prefix | 1/16 Fixed |
| Uplink/Downlink Ratio | 50% Fixed |
| Radio Frequency | |
| GPS | GPS Clock Synchronization |
| Transceiver | |
| EIRP | -33 dBm (FCC/IC), -20 dBm (CE) |
| Frequency Accuracy | ±2.5 ppm without GPS synchronization<br>±0.2 ppm with GPS synchronization |
| Channel Bandwidth | 100 MHz |
| Operating Channels | 24.1 GHz, 24.2 GHz |
| Modulation | 64QAM MIMO<br>16QAM MIMO<br>QPSK MIMO<br>QPSK SISO<br>1/4x QPSK SISO |
| Integrated Split Antenna | |
| TX Gain | 33 dBi |
| RX Gain | 38 dBi |
| Beamwidth | <3.5° |
| Front-to-Back Ratio | 70 dB |
| Polarity | Dual-Slant Polarization |
| Cross-Polarity Isolation | > 28 dB |

FIG. 21

RADIO SYSTEM FOR LONG-RANGE HIGH SPEED WIRELESS COMMUNICATION

RELATED APPLICATION

This application claims the benefit of U.S. Provisional Application No. 61/762,814, entitled "RADIO SYSTEM FOR LONG-RANGE HIGH-SPEED WIRELESS COMMUNICATION," by inventors Gary Schulz, John Sanford, Lance Lascari, Christopher Fay, Richard Keniuk, Jude Lee, and Charles Macenski, filed Feb. 8, 2013.

BACKGROUND

Field

This disclosure is generally related to a wireless communication system. More specifically, this disclosure is related to a radio system for high-speed, long-range wireless communication.

Related Art

The rapid development of optical fibers, which permit transmission over longer distances and at higher bandwidths, has revolutionized the telecommunications industry and has played a major role in the advent of the information age. However, there are limitations to the application of optical fibers. Because laying optical fibers in the field can require a large initial investment, it is not cost effective to extend the reach of optical fibers to sparsely populated areas, such as rural regions or other remote, hard-to-reach areas. Moreover, in many scenarios where a business may want to establish point-to-point links among multiple locations, it may not be economically feasible to lay new fibers.

On the other hand, wireless radio communication devices and systems provide high-speed data transmission over an air interface, making it an attractive technology for providing network connections to areas that are not yet reached by fibers or cables. However, currently available wireless technologies for long-range, point-to-point connections encounter many problems, such as limited range and poor signal quality.

SUMMARY

One embodiment of the present invention provides a radio assembly. The radio assembly includes an antenna housing unit that houses a pair of reflectors which are situated on a front side of the antenna housing unit, a printed circuit board (PCB) that includes at least a transmitter and a receiver, and a backside cover. The PCB is situated within a cavity at a backside of the antenna housing unit and the backside cover covers the cavity, thereby enclosing the PCB within the antenna housing unit.

In a variation on this embodiment, the pair of reflectors include a pair of parabola dishes.

In a further variation, the pair of parabola dishes partially overlap with each other.

In a further variation, the parabola dishes have different diameters, and a parabola dish with a larger diameter is coupled to the receiver.

In a variation on this embodiment, the radio assembly includes a pair of feed antennas that are coupled to the transmitter and the receiver.

In a variation on this embodiment, the radio assembly includes a mounting unit for mounting the radio assembly onto a pole, wherein the mounting unit is coupled to the backside of the antenna housing unit.

In a further embodiment, the mounting unit includes an azimuth-adjustment mechanism for adjusting the reflectors' azimuth and an elevation-adjustment mechanism for adjusting the reflectors' elevation.

In a variation on this embodiment, the PCB further includes a field-programmable gate array (FPGA) chip coupled to the transmitter and the receiver.

In a further embodiment, the PCB further comprises a central processing unit (CPU) coupled to the FPGA chip.

In a variation on this embodiment, the PCB further comprises a GPS receiver,

In a variation on this embodiment, the transmitter and the receiver are configured to operate in a license-free 24 GHz frequency band.

One embodiment of the present invention provides a user interface for configuring a radio. The user interface includes a display and a number of selectable tabs presented on the display. A selection of a respective tab results in a number of user-editable fields being displayed, thereby facilitating a user in configuring and monitoring operations of the radio.

In a variation on this embodiment, the selectable tabs include a main tab, which displays current values of a plurality of configuration settings of the radio and traffic status for a link associated with the radio.

In a variation on this embodiment, the selectable tabs include a wireless tab, which enables the user to set a plurality of parameters for a wireless link associated with the radio.

In a further variation, the plurality of parameters include at least one of: a wireless mode of the radio, a duplex mode for the wireless link, a transmitting frequency, a receiving frequency, a transmitting output power, a current modulation rate, and a gain setting for a receiving antenna.

In a variation on this embodiment, the selectable tabs include a network tab, which enables the user to configure settings for a management network associated with the radio.

In a variation on this embodiment, the selectable tabs include a services tab, which enables the user to configure management services associated with the radio.

In a further variation, the management services include at least one of: a ping service, a Simple Network Monitor Protocol (SNMP) agent, a web server, a Secure Shell (SSH) server, a Telnet server, a Network Time Protocol (NTP) client service, a dynamic Domain Name System (DNS), a system log service, and a device discovery service.

In a variation on this embodiment, the selectable tabs include a system tab, which enables the user to perform at least one of the following operations: reboot the radio, update firmware, manage a user account, and save or upload a configuration file.

BRIEF DESCRIPTION OF THE FIGURES

FIG. 4A presents a diagram illustrating an exemplary exploded view of the radio assembly, in accordance with an embodiment of the present invention.

FIG. 6A presents a diagram illustrating an exemplary exploded view of the backside cover subassembly, in accordance with an embodiment of the present invention.

FIG. 6B presents a diagram illustrating an exemplary view of the assembled backside cover subassembly, in accordance with an embodiment of the present invention.

FIG. 9B presents the assembly view of the radio-mounting bracket subassembly, in accordance with an embodiment of the present invention.

FIG. 17 presents a diagram illustrating an exemplary view of the configuration interface, in accordance with an embodiment of the present invention.

FIG. 20 presents a diagram illustrating one variation of the receive sensitivity specifications of the radio for various modulation schemes, in accordance with an embodiment of the present invention.

FIG. 21 presents a diagram illustrating one variation of the general specifications of the radio, in accordance with an embodiment of the present invention.

In the figures, like reference numerals refer to the same figure elements.

All dimensions marked in the figures are in millimeters.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

Embodiments of the present invention provide a radio system used for high-speed, long-range wireless communication. In one variation, the radio system includes a pair of dual-independent 2×2 multiple-input multiple-output (MIMO) high-gain reflector antennas, a pair of transceivers capable of transmitting and receiving high-speed data (beyond 1.4 Gbps) at the 24 GHz unlicensed frequency band, and a user-interface that provides plug-and-play capability. In one configuration, the transceivers are capable of operating in both FDD (Frequency Division Duplex) and HDD (Hybrid Division Duplex) modes. The unique design of the antenna provides long-range reachability (up to 13 km). In addition to the 24 GHz frequency band, the radio system may also operate at other unlicensed or licensed frequency bands. For example, the radio system may operate at the 5 GHz frequency band. Moreover, the radio system may be configured to operate in various transmission modes. For example, in addition to a MIMO system, it is also possible for the radio system to be configured as a single-input single-output (SISO), SIMO, or MISO system. Similarly, in addition to the FDD mode, the radio system may operation in time-division duplex (TDD) mode or a hybrid of TDD and FDD.

System Overview

Figure 1A:
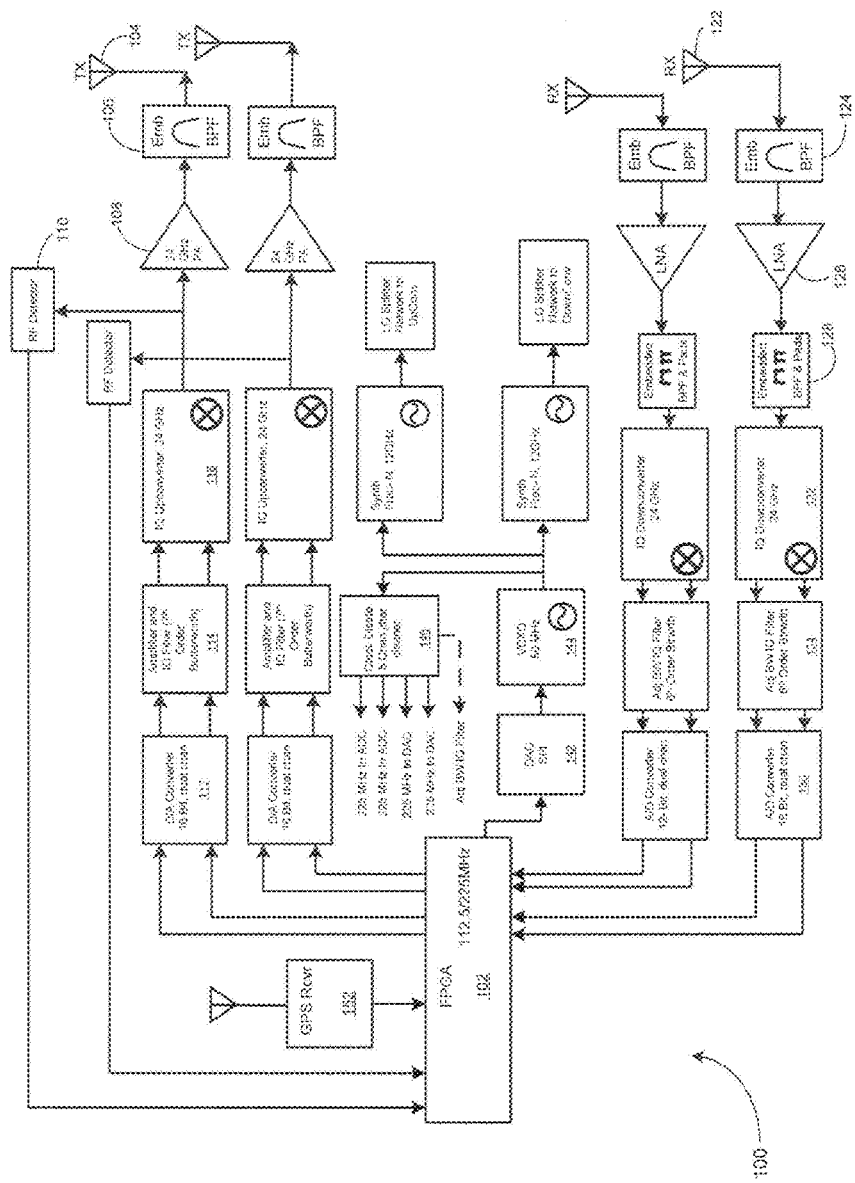
FIG. 1A presents a block diagram illustrating an exemplary architecture of the RF frontend of a radio, in accordance with an embodiment of the present invention.

FIG. 1A presents a block diagram illustrating an exemplary architecture of the RF frontend of a radio, in accordance with an embodiment of the present invention. Note that, in FIG. 1A, the RF frontend 100 includes two identical transmission paths and two identical receiving paths in order to enable 2×2 MIMO.

Each transmission path includes a transmitting antenna, such as antenna 104; a band-pass filter (BPF), such as BPF 106; a power amplifier (PA), such as PA 108; an RF detector, such as RF detector 110; a modulator; and a digital-to-analog converter (DAC), such as DAC 112. In one embodiment, the system uses a quadrature modulation scheme (also known as IQ modulation), and the modulator is an IQ modulator, which includes an IQ filter (such as IQ filter 114, which also works as a pre-amplifier) and an IQ up-converter (such as IQ up-converter 116). In one embodiment, the radio system operates at the unlicensed 24 GHz frequency band, and the IQ up-converters and the PAs are configured to operate at the 24 GHz RF band.

Each receiving path includes a receiving antenna, such as antenna 122; a band-pass filter (BPF), such as BPF 124; a low-noise amplifier (LNA), such as LNA 126; a second BPF, such as BPF 128; a demodulator; and an analog-to-digital converter (ADC), such as ADC 130. In one embodiment, the system uses a quadrature modulation scheme (also known as IQ modulation), and the demodulator is an IQ demodulator, which includes an IQ down-converter (such as IQ down-converter 132) and an IQ filter (such as IQ filter 134 with adjustable bandwidth). In one embodiment, the radio system operates at the unlicensed 24 GHz frequency band, and the IQ down-converters and the LNAs are configured to operate at the 24 GHz RF band.

In FIG. 1A, a field-programmable gate array (FPGA) chip 102 provides signal processing capability as well as clock signals to both the transmission and receiving paths. More particularly, FPGA 102 includes a baseband digital signal processor (DSP), which is not shown in the figure. In addition, FPGA 102 provides an input to a DAC 142, which in turn drives a voltage-controlled crystal oscillator (VCXO) 144 to generate a clock signal. For example, VCXO 144 may generate a 50 MHz clock signal. This low-frequency clock signal can be frequency-multiplied by fraction-N synthesizers to higher frequency sinusoidal waves, thus providing sinusoidal signals to the up- and down-converters. In addition, the output of VCXO 144 is sent to a clock distributor 146, which provides clock signals to the DACs, the ADCs, and the IQ filters with adjustable bandwidth.

Also included in FIG. 1A is a GPS (Global-Positioning System) receiver 152 for receiving GPS signals.

Figure 1B:
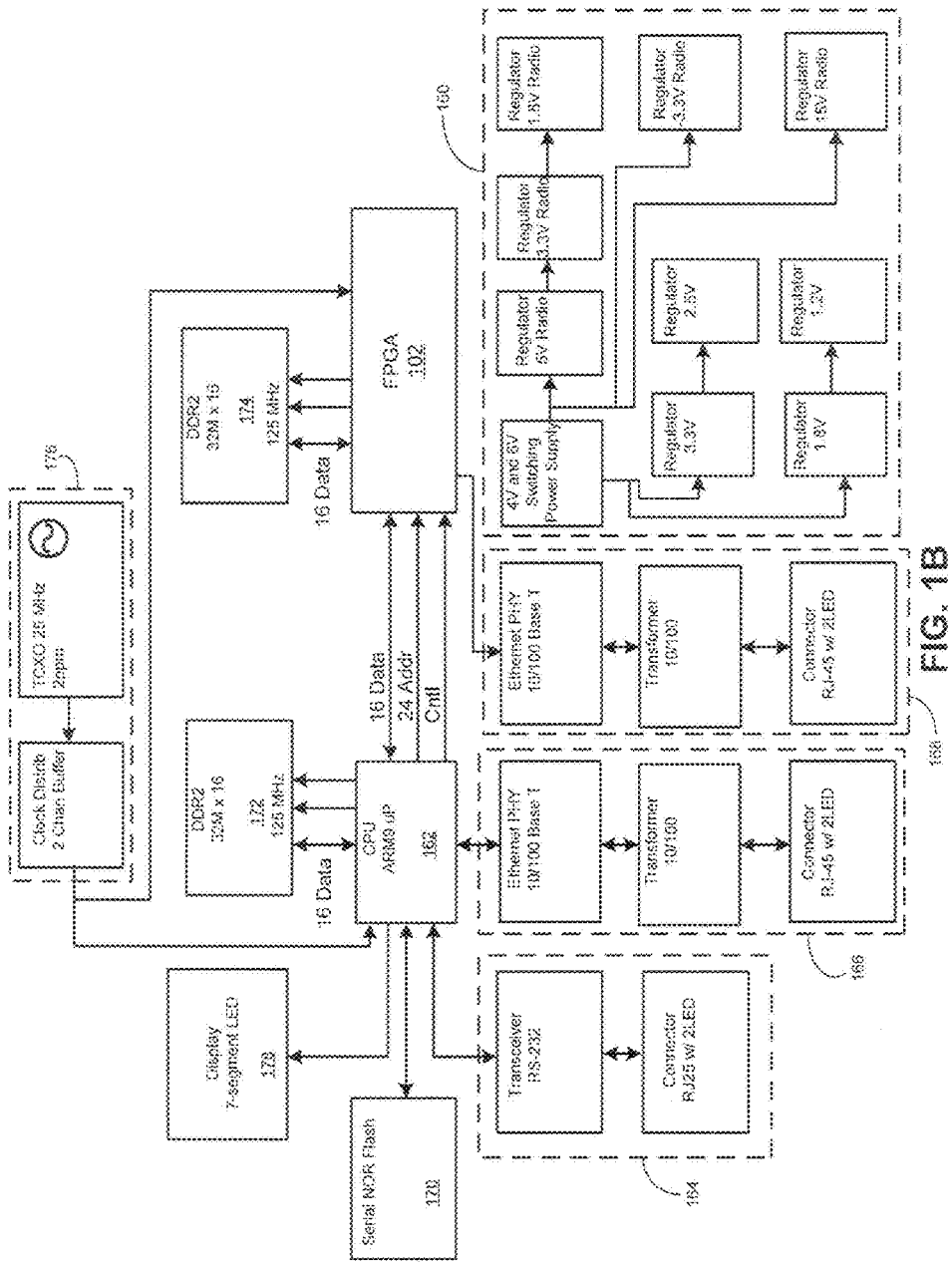
FIG. 1B presents a block diagram illustrating an exemplary architecture of power and control modules of a radio, in accordance with an embodiment of the present invention.

FIG. 1B presents a block diagram illustrating an exemplary architecture of power and control modules of a radio, in accordance with an embodiment of the present invention. FIG. 1B includes a power module 160 for providing power to the entire radio system, a CPU 162 for providing control to the radio system, and a number of control and data interfaces.

More specifically, power module 160 includes a power supply and a number of voltage regulators for providing power to the different components in the radio system. CPU 162 controls the operation of the radio system, such as the configurations or operating modes of the systems, by interfacing with FPGA chip 102. For example, the system may be configured as a full-duplex system where the transmitter and receiver are running concurrently in time, or a half-duplex system. To configure the radio system, a user can access CPU 162 via a serial interface (such as an RS-232 interface 164) or an Ethernet control interface 166. In other words, a user is able to interact with the radio system via the serial interface or the Ethernet control interface. In one embodiment, the serial port is designated for alignments of the antennas. Ethernet data interface 168 is the data port for uploading and downloading data over the point-to-point link. In other words, data to be transmitted over the point-to-point link is uploaded to FPGA chip 102, which includes the baseband DSP, via Ethernet data interface 168; and data received from the point-to-point link can be downloaded from FPGA 102 via Ethernet data interface 168. Each Ethernet interface includes an Ethernet PHY transceiver, a transformer, and an RJ-45 connector. In one embodiment, the Ethernet PHY transceiver is capable of operating at 10 Mbps and 100 Mbps. Note that each of the interfaces (or ports) also includes status LEDs for indicating the status of each port.

Other components in the radio system also include a flash memory 170 coupled to CPU 162, a random-access memory (RAM) 172 (such as a DDR2 memory) coupled to CPU 162, a RAM 174 coupled to FPGA 102, a clock source 176 providing clock signals to CPU 162 and FPGA 102, and an LED display 178 with two digits displaying the received signal strength in dBm.

Note that the various components (with the exception of the antennas) for the radio system shown in FIGS. 1A and 1B can be integrated onto a single printed circuit board (PCB). Also note that FIGS. 1A and 1B demonstrate the architecture of a single radio. To establish a point-to-point link, a pair of radios is needed, one for each node.

In the example shown in FIG. 1A, the modulation scheme used is quadrature modulation, which relies on orthogonally defined inphase and quadrature signals (or I- and Q-signals). To ensure orthogonality between the I- and Q-signals, the amplitude of the I- and Q-signals should remain equal. However, in practice, a number of factors can affect the amplitude and phase of the I- and Q-signals, thus resulting in a misalignment between these signals. A misalignment in the I- and Q-signals may result in the increased bit error rate of the demodulated signal due to carrier leakage and imperfect sideband cancellation. Therefore, it is desirable to align the I- and Q-signals. Such alignment can result in cancellation of the carrier as well as the sideband signals. In one embodiment of the present invention, FPGA 102 generates calibration tones that can be used for IQ alignment purpose.

Figure 1C:
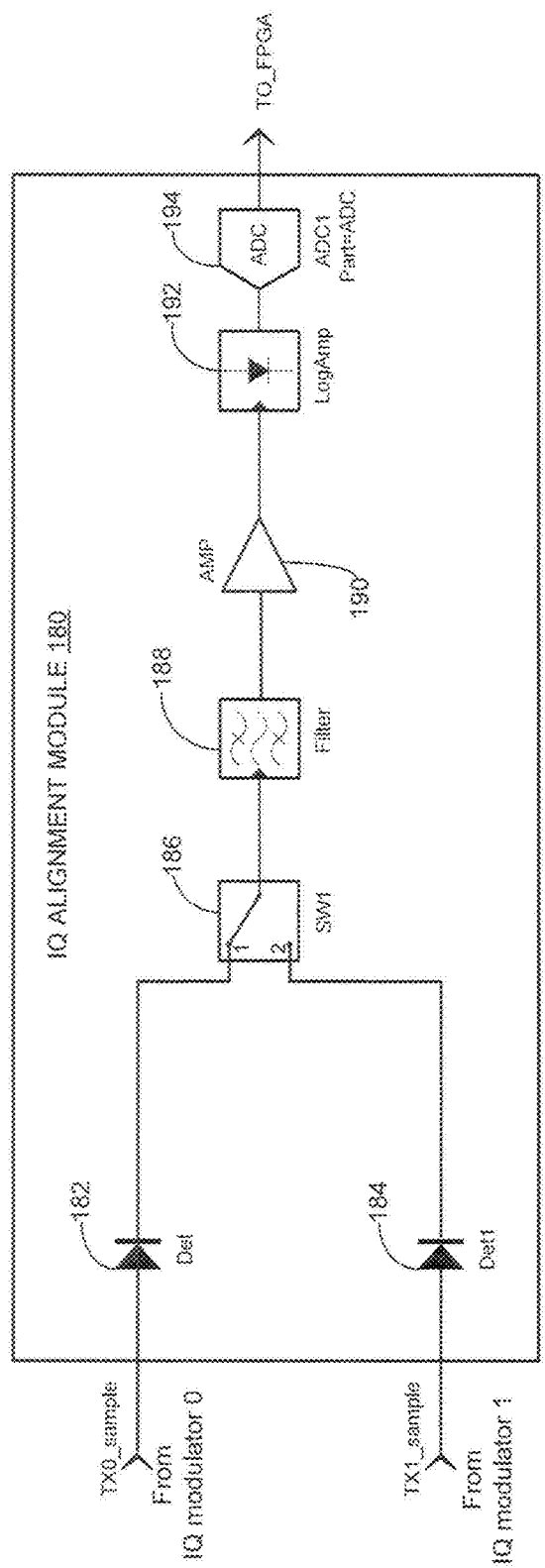
FIG. 1C presents a block diagram illustrating an exemplary architecture of an IQ alignment module, in accordance with an embodiment of the present invention.

FIG. 1C presents a block diagram illustrating an exemplary architecture of an IQ alignment module, in accordance with an embodiment of the present invention. IQ alignment module 180 includes two detectors 182 and 184, a switch 186, a filter 188, an amplifier 190, a log amplifier 192, and an ADC 194.

Note that the low-level detectors (detectors 182 and 184) are placed after the IQ modulators, or the image-reject converters. During operation, the outputs of detectors 182 and 184 are alternately fed (via switch 186) to a band-limited measuring receiver, which includes filter 188, amplifier 190, log amplifier 192, and ADC 194. The selection of the calibration tone frequency determines which transmitter parameter is measured. The combinations of tones sent basically allow detectors 182 and 184 to operate as mixers with one strong tone acting as a local oscillator to convert other tones down to a low frequency that is easy to measure with low cost hardware.

Assuming that filter 188 sets its center frequency, and thus the center frequency of the measuring receiver, to $f_m$ for selecting one tone near $f_m$ only, then one can measure the carrier leakage by measuring the baseband signal. More specifically, in this situation, a baseband tone of $\pm f_m$ ($=f_{RF}\pm f_m$ at the output of the modulator) would produce a tune at $f_m$ in the measuring receiver at a level that is proportional to the amount of carrier leakage. This is because the tone at $f_{RF}\pm f_m$ acts as the local oscillator to mix down the residual carrier that is at the frequency $f_{RF}$. The tone level is measured by ADC 194 and read by an FPGA, such as FPGA 102, for processing. Consequently, self-calibration or adjustment can be made to eliminate the carrier leakage.

In addition to measuring carrier leakage, IQ alignment module 180 can also be configured to measure the rejection to the sideband. To do so, in one variation, a transmitter tone is set at either $+\frac{1}{2}f_m$ or $-\frac{1}{2}f_m$, which can produce a measurable result proportional to the level of undesired sideband. Because the transmitter outputs include signals at $f_{RF}\pm\frac{1}{2}f_m$ (the strong "local oscillator" signal for the detectors) and opposite sideband signal, the power level seen by the measuring receiver at $f_m$ is proportional to the amount of undesired sideband signal present ($f_m$ away from the strong tone centered at $f_{RF}\pm\frac{1}{2}f_m$). Similar to the process of carrier leakage elimination, the sideband rejection measurement can be used for self-calibration or cancellation of the undesired sideband.

In some variations, the specific tones used by the transmitters are the nearest frequency bins already available in the IFFT function of the transmitters. In one variation, filter 188 sets its center frequency $f_m$ at around 10.7 MHz due to the availability of low-cost filters. This frequency selection also makes implementations of the rest of the receiver straightforward.

Implementing IQ alignment module 180 to augment the transmitters of the radio system provides continuous self-correction (or self-calibration) functionality to the transmitters. Unlike other conventional integrated transceivers that perform some sort of corrections when "offline," embodiments of the present invention never go offline when operating in full duplex mode, where transmitters and receivers operate at different frequencies. As a result, this allows for the use of IQ image reject mixers with limited sideband rejection to be applied as quadrature modulators and demodulators. In one variation, the IQ modulation uses Zero intermediate frequency (ZIF). Note that in addition to allowing parts with modest performance to be used in areas where IQ amplitude and phase balance is critical, this automatic IQ alignment scheme also assures that the radio maintains sufficiently high levels of performance across a wide range of temperatures and signal levels.

Radio Assembly

Figure 2A:
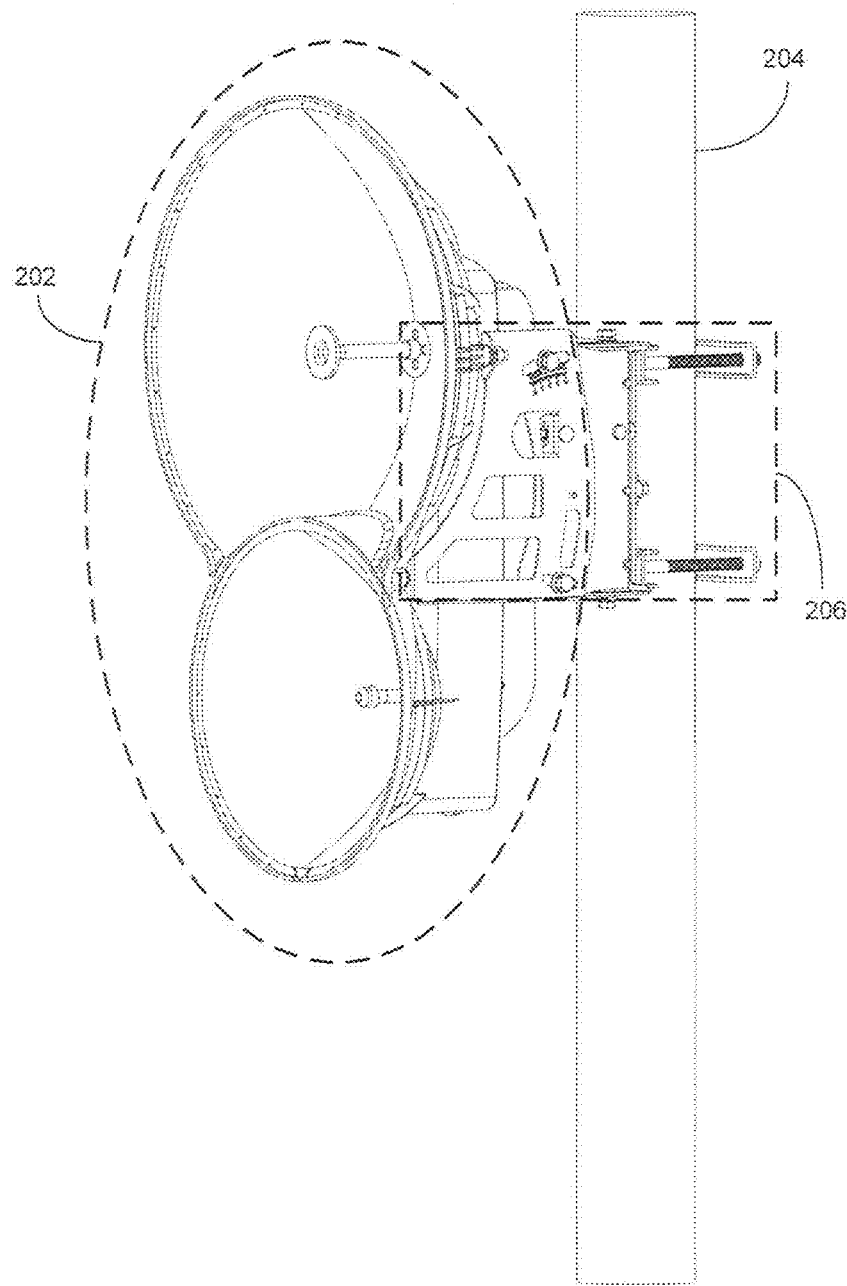
FIG. 2A presents a diagram illustrating an exemplary view of a radio mounted on a pole, in accordance with an embodiment of the present invention.
Figure 2B:
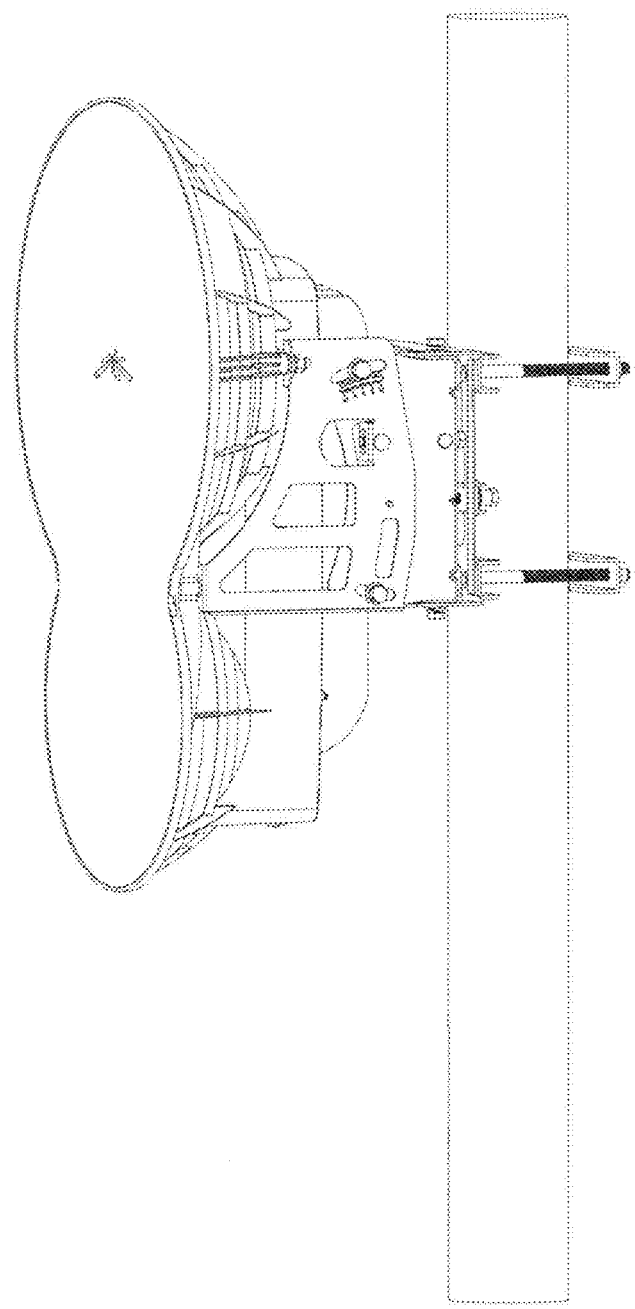
FIG. 2B presents a diagram illustrating an exemplary view of a radio mounted on a pole, in accordance with an embodiment of the present invention.

FIG. 2A presents a diagram illustrating an exemplary view of a radio mounted on a pole, in accordance with an embodiment of the present invention. In FIG. 2A, a radio 202 is mounted to pole 204 via a mounting unit 206. In contrast with other conventional radios where antennas are built as separate units from other radio components, such as tuners and transceivers, various embodiments of the present invention provide an integrated solution where other radio components are housed together with the antenna. From FIG. 2A, one can see that the tuning components, as well as other radio components, are housed together with the antennas. In some variations, compact, highly efficient form factor of the radio system and the utilization of the worldwide license-free 24 GHz band may provide cost-effective and instant deployment of the radio system anywhere in the world. FIG. 2B presents a diagram illustrating an exemplary view of a radio mounted on a pole, in accordance with an embodiment of the present invention. In FIG. 2B, a radome is used to cover the antenna surface, thus protecting the antenna from hazardous weather.

Figure 3B:
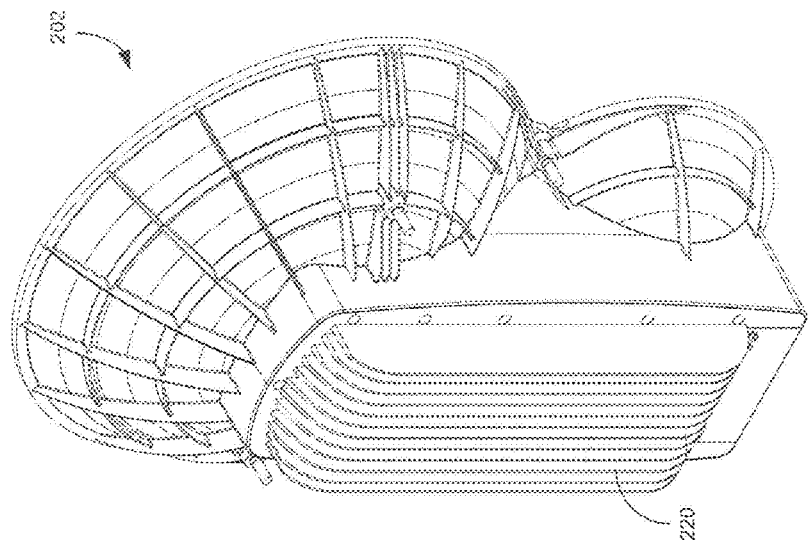
FIG. 3B presents an exemplary view of a radio showing the backside of the radio, in accordance with an embodiment of the present invention.
Figure 3A:
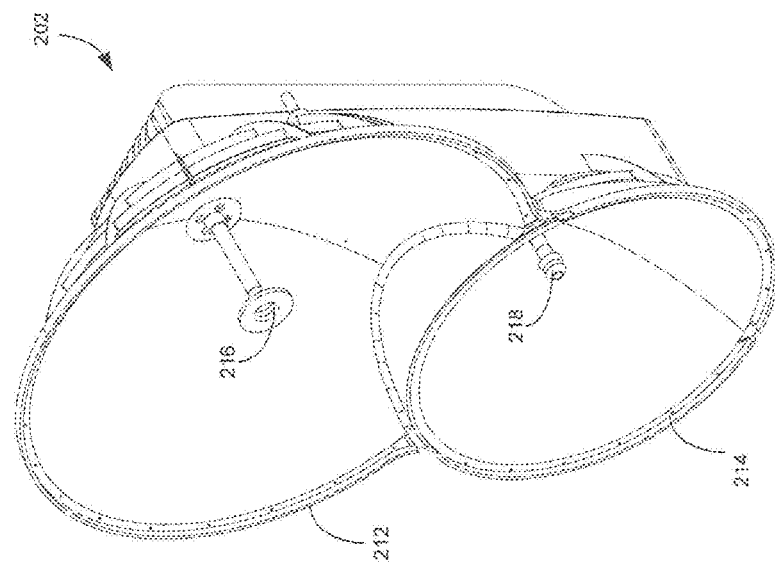
FIG. 3A presents an exemplary view of a radio showing the front side of the radio, in accordance with an embodiment of the present invention.

FIG. 3A presents an exemplary view of a radio showing the front side of the radio, in accordance with an embodiment of the present invention. From FIG. 3A, one can see that the front side of radio 200 includes two circular shaped reflectors, an upper reflector 212 and a lower reflector 214; and two feed antennas, an upper feed antenna 216 and a lower feed antenna 218. In one embodiment, upper feed antenna 216 is coupled to the receiver of the radio, whereas lower feed antenna 218 is coupled to the transmitter of the radio. The reflecting surfaces of the reflectors are carefully designed to ensure long-range reachability. In one embodiment, reflectors 212 and 214 are parabolic reflectors. We will describe the reflectors in more detail later.

FIG. 3B presents an exemplary view of a radio showing the backside of the radio, in accordance with an embodiment of the present invention. From FIG. 3B, one can see that the backside of radio 200 includes a substantially rectangular enclosure 220, which houses a PCB. Note that the rest of the radio components, including the CPU, the FPGA, the transmitters, the receivers, etc., can all be mounted to the single PCB.

Figure 3C:
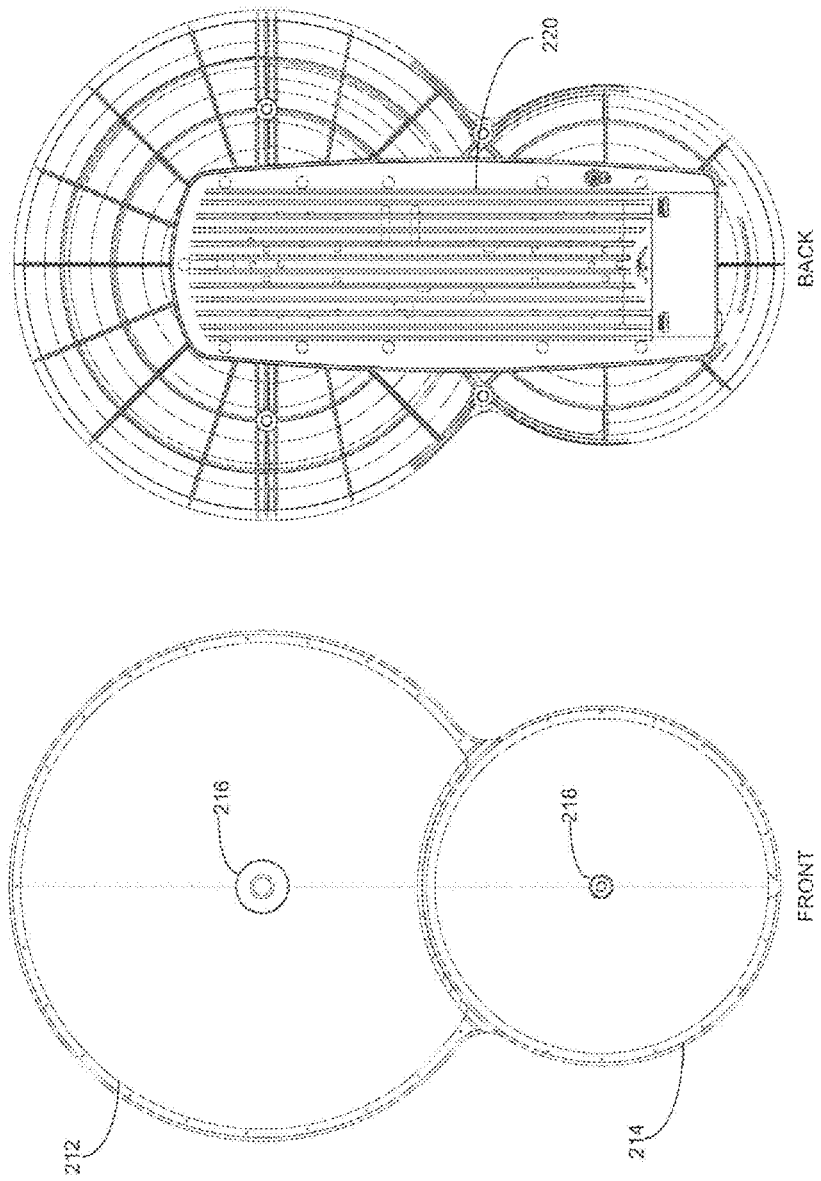
FIG. 3C presents the front view and the back view of the radio, in accordance with an embodiment of the present invention.

FIG. 3C presents the front view and the back view of the radio, in accordance with an embodiment of the present invention. From FIG. 3C, one can see that the two reflectors together are shaped like an upside-down 8, with upper reflector 212 being a partial circle and having a larger radius than lower reflector 214, which is a full circle. In addition, one can see that rectangular enclosure 220 is attached to the backside of the two reflectors. Note that the proximity of the reflectors to the PCB housed in enclosure 220 not only ensures a compact radio system, but also eliminates the need for an external cable to connect the reflector to other radio components, thus obviating the need for tuning the transmitter antennas.

Figure 3D:
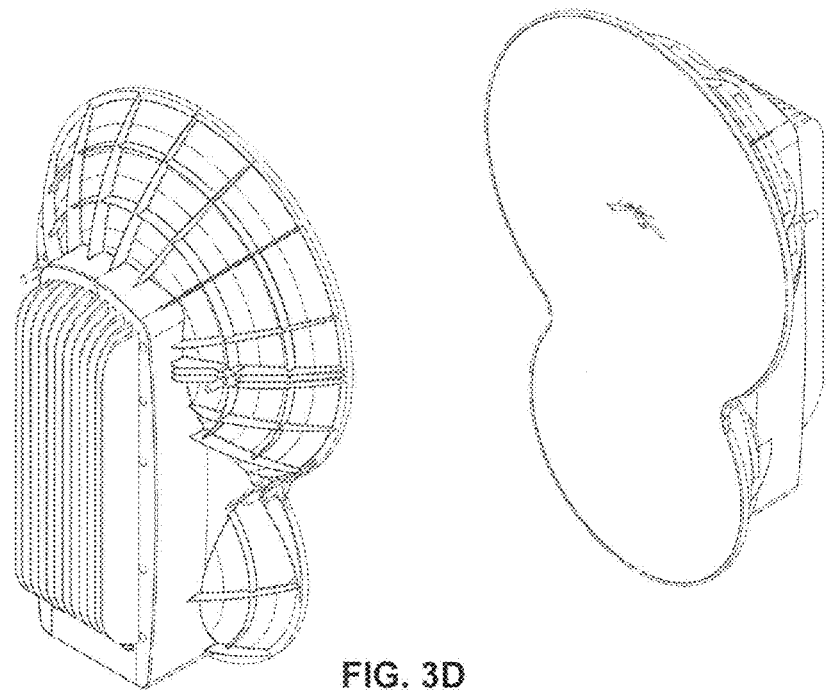
FIG. 3D presents exemplary views of the radio with the radome cover on, showing the front and backside of the radio, in accordance with an embodiment of the present invention.
Figure 3E:
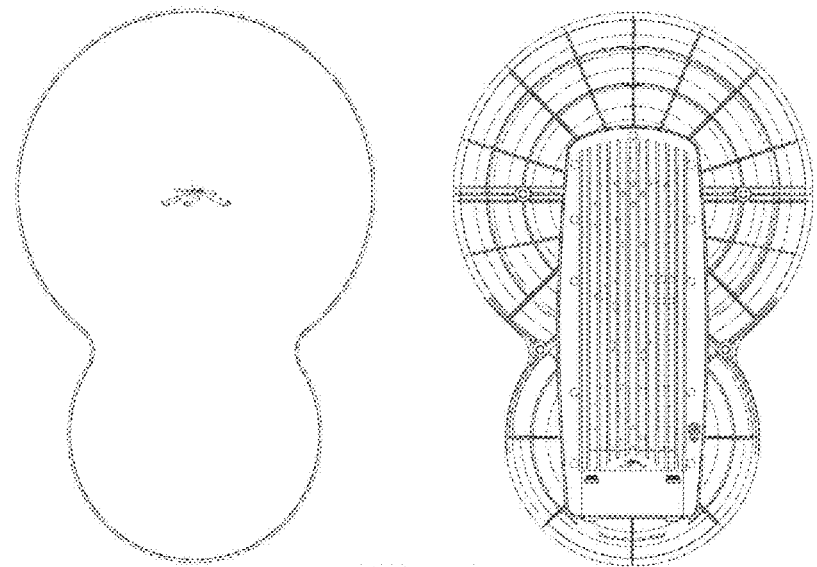
FIG. 3E presents the front view and the back view of the radio with the radome cover on, in accordance with an embodiment of the present invention.

FIG. 3D presents exemplary views of the radio with the radome cover on, showing the front and backside of the radio, in accordance with an embodiment of the present invention. FIG. 3E presents the front view and the back view of the radio with the radome cover on, in accordance with an embodiment of the present invention.

FIG. 4A presents a diagram illustrating an exemplary exploded view of the radio assembly, in accordance with an embodiment of the present invention. In FIG. 4A, radio 400 includes a number of major components as well as a number of auxiliary or connecting components. More specifically, the major components include a reflecting housing 402, a PCB 404, and a backside cover 406. Reflecting housing 402 includes a front portion that houses and supports the reflectors for the antenna and a back portion that together with backside cover 406 provides a housing space for PCB 404. PCB 404 includes most radio components, such as the CPU, the FPGA, the transmitter, and the receiver. Backside cover 406 covers the backside of the radio. More specifically, backside cover 406 includes a hollowed space that snugly fits PCB 404. In addition, the fins on backside cover 406 improve dissipation of heat generated by the radio.

The auxiliary components include a radome cover 408 for protecting the antenna from weather damage; an upper feed-shield subassembly 410 for shielding a feed antenna to the upper reflector; a lower feed-shield subassembly 412 for shielding a feed antenna to the lower reflector; heat sinks 414 for dissipating heat from components on PCB 404; thermal pads 416; microwave absorbers 418; a strap 420 for an RJ-45 connector; a number of screws 422 for coupling together reflecting housing 402, PCB 404, and backside cover 406; and a number of screw covers 424.

Figure 4C:
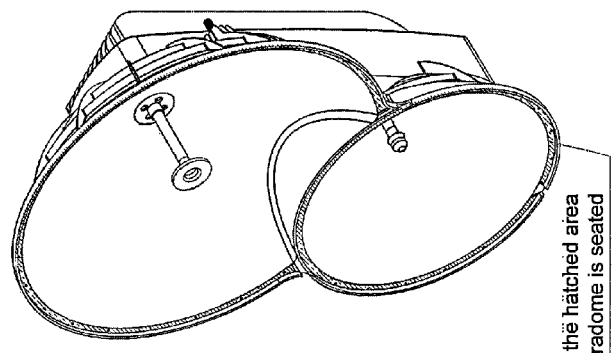
FIG. 4C presents a diagram illustrating where to apply the sealant for the radome, in accordance with an embodiment of the present invention.
Figure 4B:
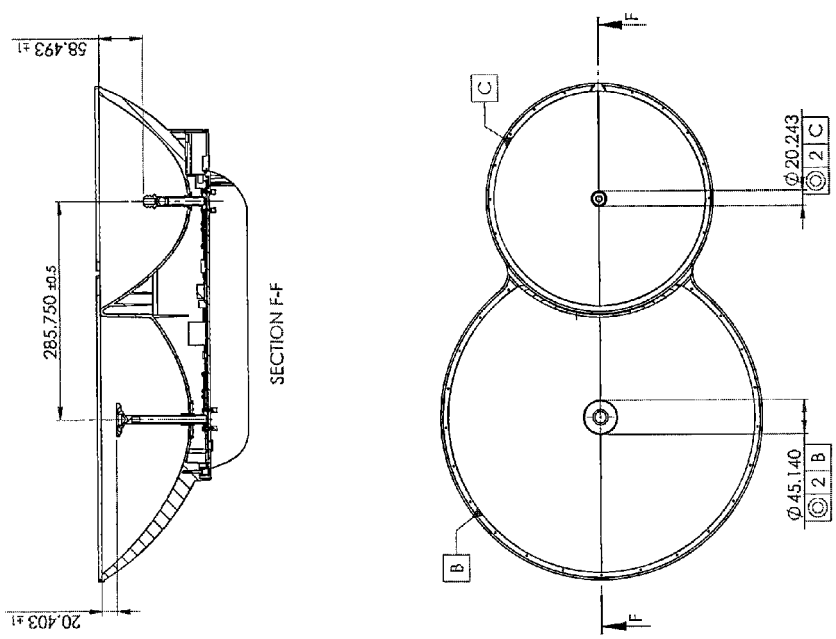
FIG. 4B presents a diagram illustrating the cross-sectional view of the assembled radio, in accordance with an embodiment of the present invention.

FIG. 4B presents a diagram illustrating the cross-sectional view of the assembled radio, in accordance with an embodiment of the present invention. The length unit used in the drawings is millimeters. The upper drawing shows the cross section of the radio system and the bottom drawing shows the front view of the assembled radio and the cutting plane (along line FF). FIG. 4C presents a diagram illustrating where to apply the sealant for the radome, in accordance with an embodiment of the present invention. In FIG. 4C, along the rims of the front surface of the reflecting housing, a narrow region is marked with hatched lines; the sealant needs to stay within the hatched region before and after the radome is seated and should not intrude into un-hatched regions. In another words, only a thin layer of sealant material should be applied before the radome is installed to prevent the sealant material from overflowing to the un-hatched region.

Figure 5:
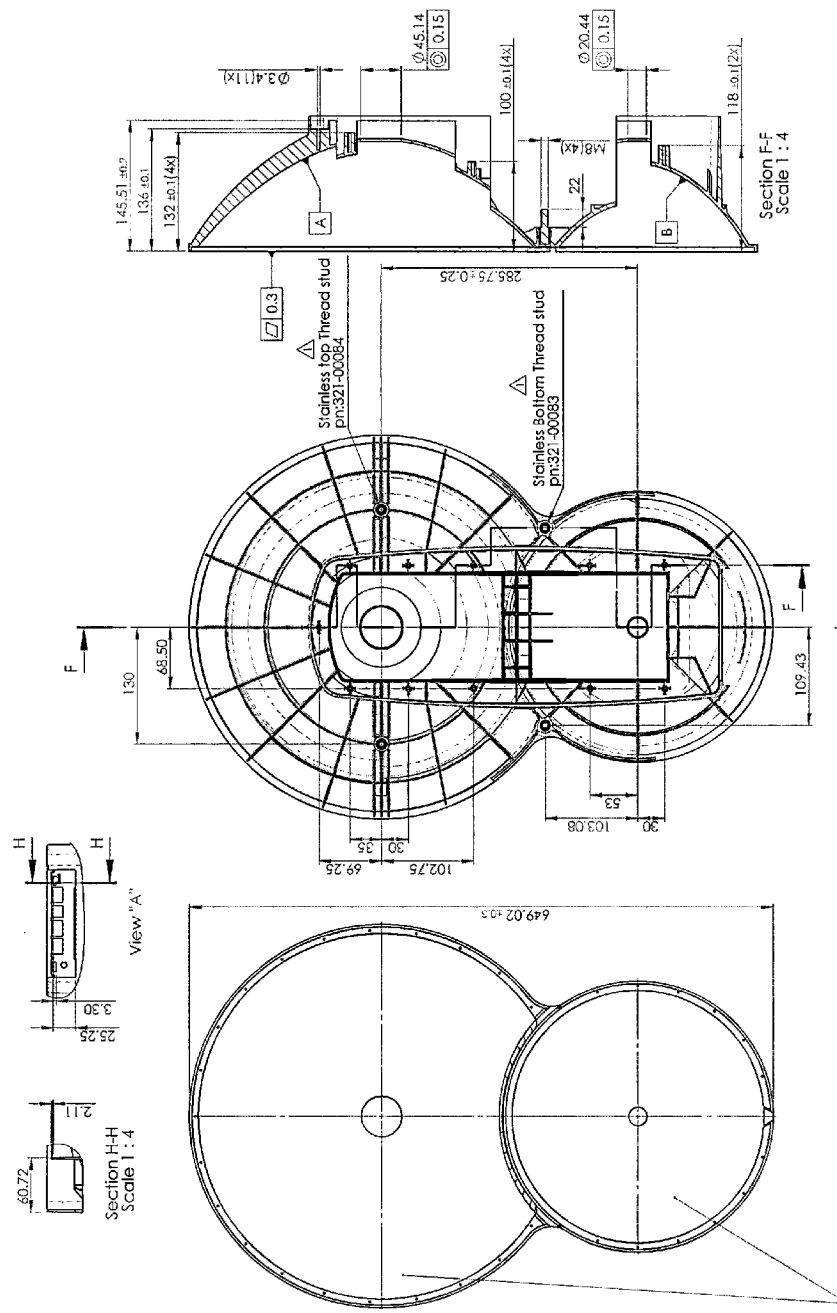
FIG. 5 illustrates a detailed mechanical drawing of the reflecting housing, in accordance with an embodiment of the present invention.

FIG. 5 illustrates a detailed mechanical drawing of the reflecting housing, in accordance with an embodiment of the present invention. More specifically, FIG. 5 provides exemplary dimensions of the reflecting housing. In the example shown in FIG. 5, all lengths are expressed in millimeters. For example, the vertical length of the radio system, or the sum of diameters of the upper and lower reflectors, is around 650 mm. Note that such a compact size makes installation of the radio much easier than many of the conventional radio systems. Note that the radios are installed outdoors, and thus a weatherproof material is needed for making the reflecting housing. In one embodiment, a hard plastic material, such as polycarbonate (PC), is used for making the reflecting housing. To form the reflectors, a metal layer can be deposited on the front concave surface of the reflecting housing. In one embodiment, a layer of aluminum (Al) is deposited using a physical vapor deposition (PVD) technique. In a further embodiment, before the PVD of the Al layer, the reflecting area is polished. For example, a diamond polishing process that meets the SPI (Society of the Plastic Industry) A-1 standard can be performed before the deposition of the metal layer.

FIG. 6A presents a diagram illustrating an exemplary exploded view of the backside cover subassembly, in accordance with an embodiment of the present invention. In FIG. 6A, a backside cover subassembly 600 includes a rear lid 602, an insulation film 604, an o-ring seal 606, a setscrew 608, a washer 610, and a nut 612. More specifically, rear lid 602 covers the backside of the radio system. In one embodiment, a material that is similar to the one used for the reflecting housing can be used to make rear lid 602. For example, rear lid 602 can also be fabricated using PC. Insulation film 604 and o-ring seal 606 provide electrical insulation as well as waterproofing capability, thus preventing damages caused by weather or other factors to the radio components. Various insulation materials can be used as insulation film 604. In one embodiment, insulation film 604 includes a Kapton® (registered trademark of DuPont of Wilmington, Del.) film. FIG. 6B presents a diagram illustrating an exemplary view of the assembled backside cover subassembly, in accordance with an embodiment of the present invention. In FIG. 6B, the insulation film and the o-ring have been applied to the inside of the rear lid. Note that the insulation film should be adhered carefully on the inside of the rear lid and no bubbles should be formed.

Figure 6C:
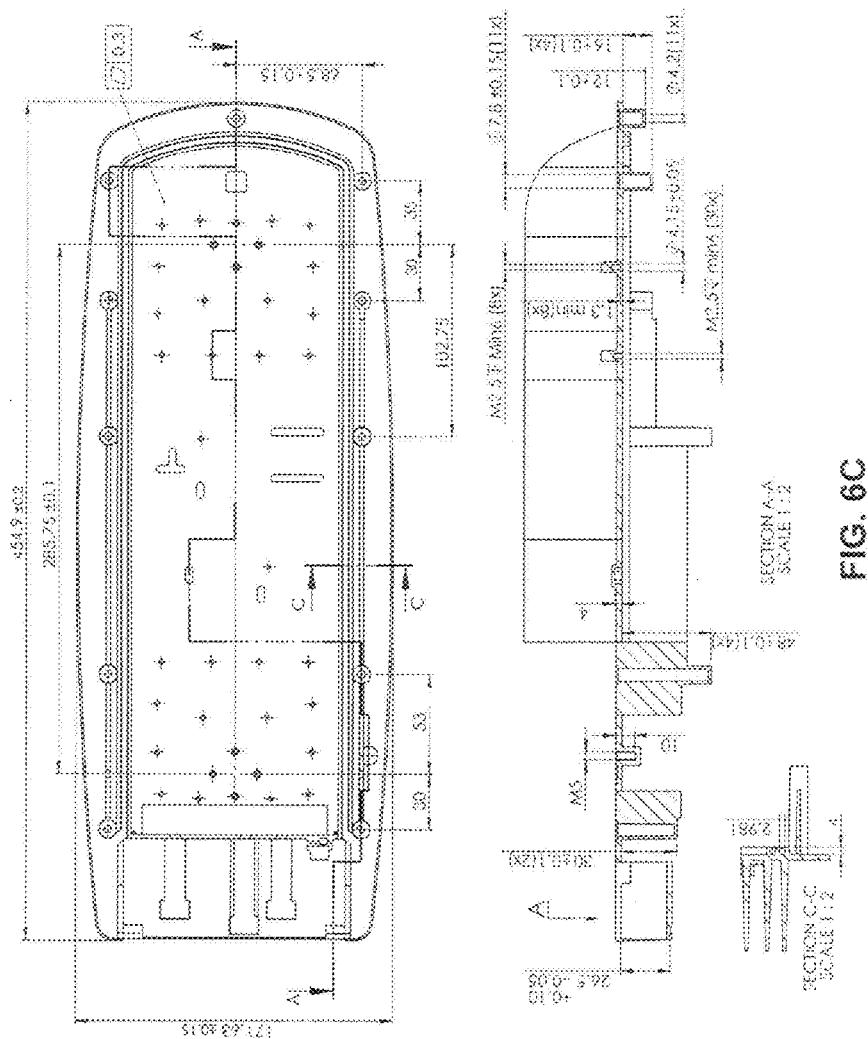
FIG. 6C presents a diagram illustrating a front view and cross-sectional views of the rear lid, in accordance with an embodiment of the present invention.

FIG. 6C presents a diagram illustrating a front view and cross-sectional views of the rear lid, in accordance with an embodiment of the present invention. More specifically, the top drawing shows the front view of the rear lid, the middle drawing shows a cross-sectional view of the rear lid across the cutting plane AA, and the bottom drawing shows a partial-sectional view of the rear lid across the cutting plane CC. From the sectional views, one can see more details, including the shape and dimensions of the heat dissipation fins on the backside of the rear lid.

Figure 6D:
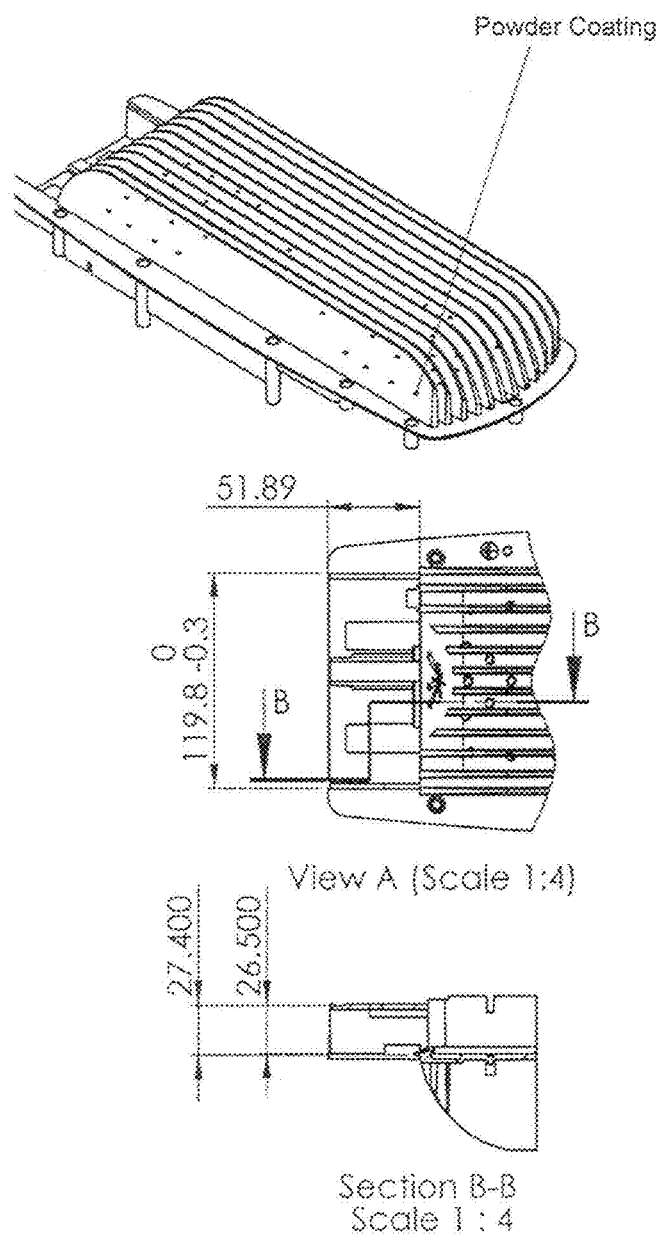
FIG. 6D illustrates the backside of the rear lid in more detail, in accordance with an embodiment of the present invention.

FIG. 6D illustrates the backside of the rear lid in more detail, in accordance with an embodiment of the present invention. The top drawing shows the entire backside from an angle. The middle drawing shows a portion of the backside viewed from the top. The bottom drawing shows a partial-sectional view of the rear lid across a cutting plane BB.

Figure 7A:
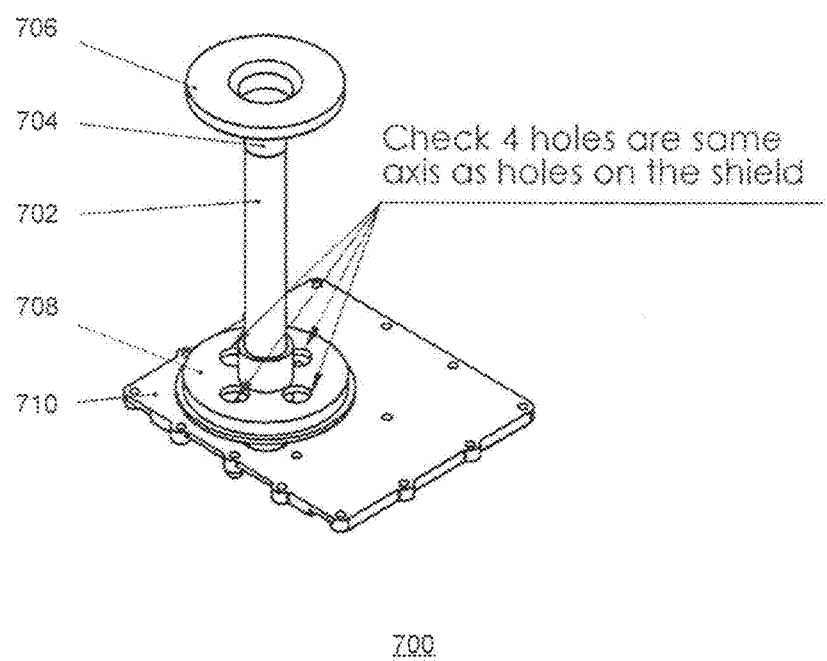
FIG. 7A presents a diagram illustrating an exemplary view of the upper feed-shield subassembly, in accordance with an embodiment of the present invention.

FIG. 7A presents a diagram illustrating an exemplary view of the upper feed-shield subassembly, in accordance with an embodiment of the present invention. In FIG. 7A, upper feed-shield subassembly 700 includes a waveguide tube 702, a spacer 704, a sub-reflector 706, a flange 708, and an RF shield 710. Waveguide tube 702 houses the waveguide of the feed antenna to the upper reflector of the radio antenna. Spacer 704 separates the waveguide and sub-reflector 706; sub-reflector 706 reflects the RF waves to the upper reflector. Flange 708 and the holes on it enable upper feed-shield subassembly 700 to be physically secured to other underlying structures.

Figure 7B:
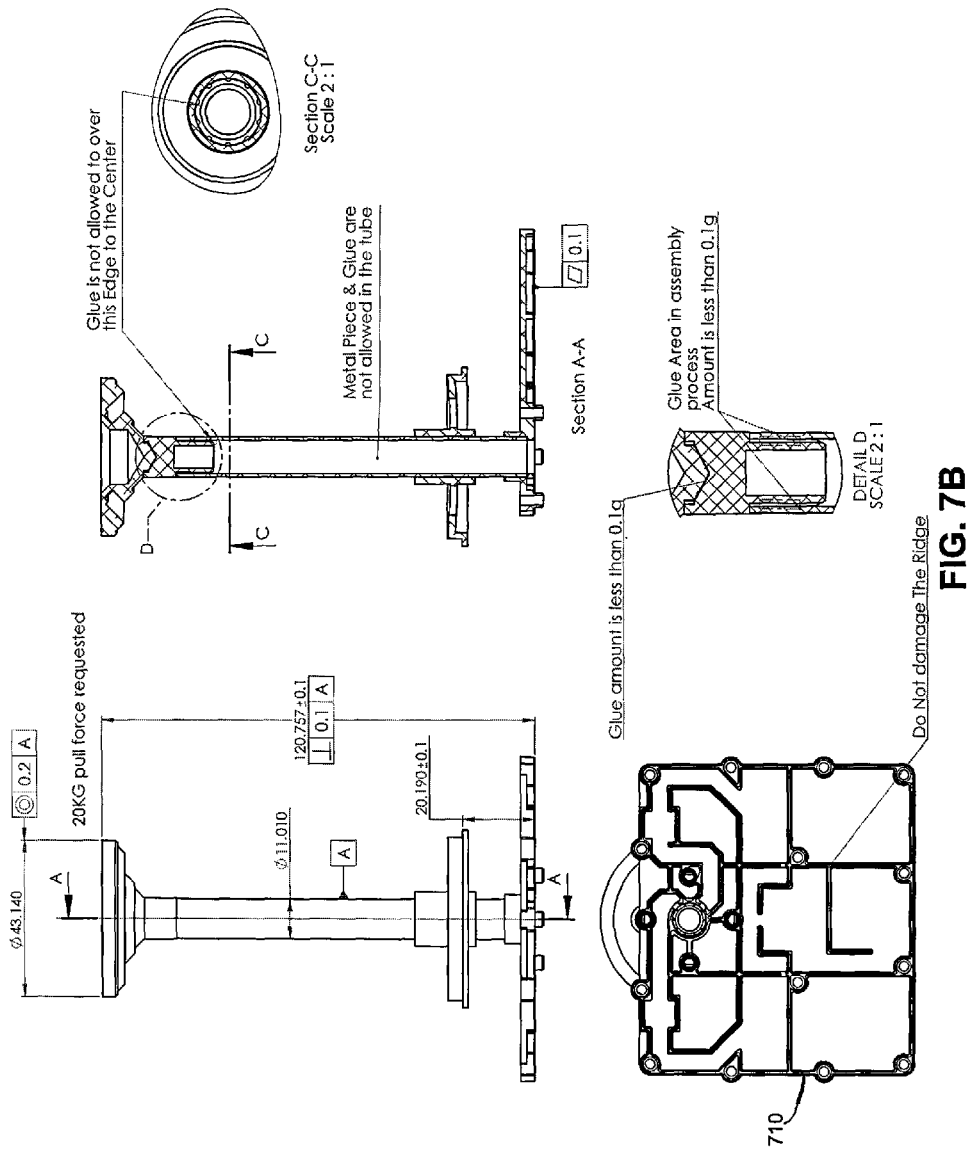
FIG. 7B presents detailed mechanical drawings for the upper feed-shield subassembly, in accordance with an embodiment of the present invention.

FIG. 7B presents detailed mechanical drawings for the upper feed-shield subassembly, in accordance with an embodiment of the present invention. The upper left drawing shows the front view of the upper feed-shield subassembly. The upper right drawing shows a cross-sectional view of the upper feed-shield subassembly along a vertical cutting plane AA and a horizontal cutting plane CC. The lower left drawing shows the bottom view of the upper feed-shield subassembly, illustrating in detail the bottom of RF shield 710. Note that the ridges on RF shield 710 provide space for components on the underlying FPGA board. The lower right drawing is a detailed drawing of a section where glue is applied to attach the sub-reflector to the spacer and the waveguide tube.

Figure 8A:
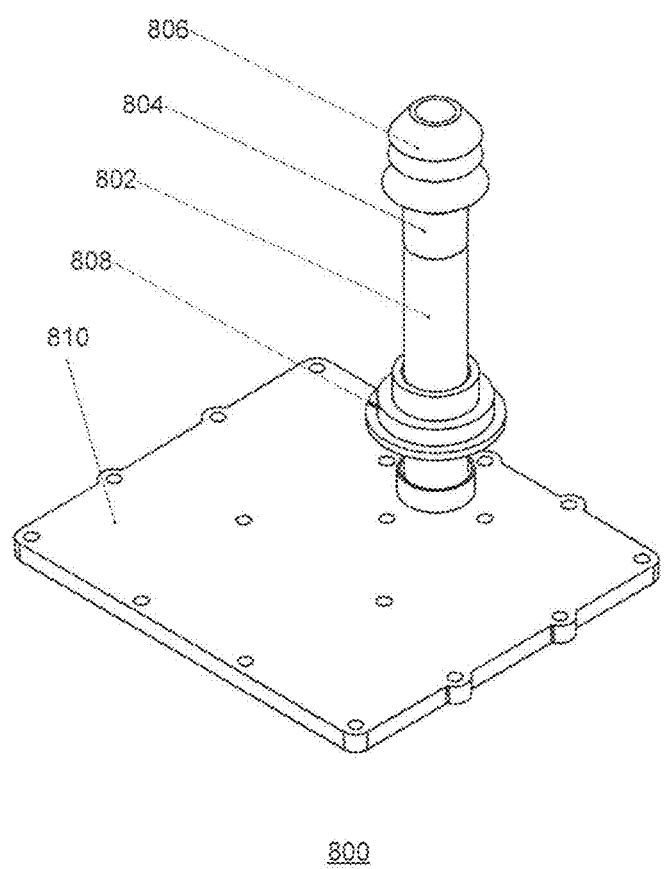
FIG. 8A presents a diagram illustrating an exemplary view of the lower feed-shield subassembly, in accordance with an embodiment of the present invention.

FIG. 8A presents a diagram illustrating an exemplary view of the lower feed-shield subassembly, in accordance with an embodiment of the present invention. In FIG. 8A, lower feed-shield subassembly 800 includes a waveguide tube 802, a spacer 804, a sub-reflector 806, a flange 808, and an RF shield 810. Waveguide tube 802 houses the waveguide of the feed antenna to the lower reflector of the radio antenna. Spacer 804 separates the waveguide and sub-reflector 806; sub-reflector 806 reflects the RF waves to the lower reflector. Flange 808 and the holes on it enable lower feed-shield subassembly 800 to be physically secured to other underlying structures.

Figure 8B:
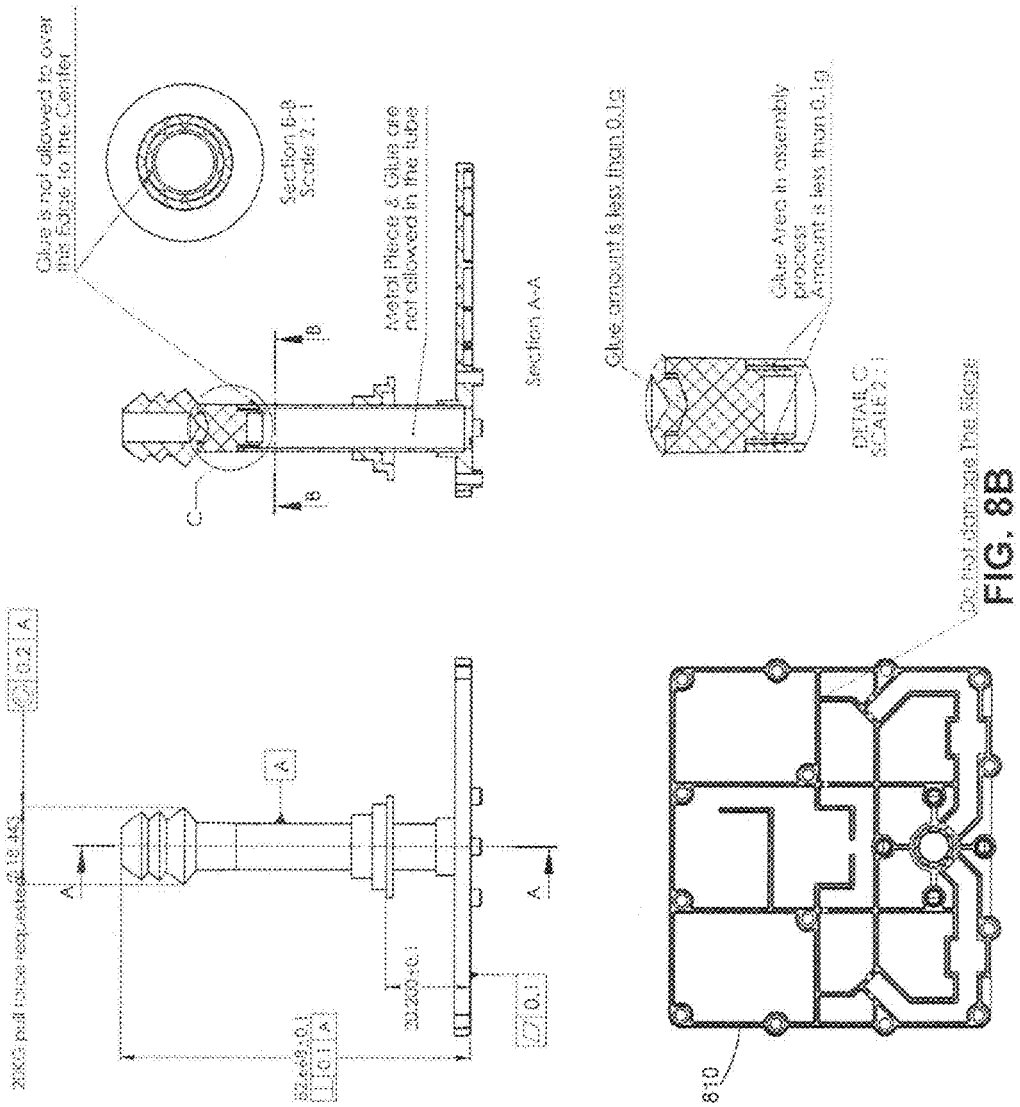
FIG. 8B presents detailed mechanical drawings for the lower feed-shield subassembly, in accordance with an embodiment of the present invention.

FIG. 8B presents detailed mechanical drawings for the lower feed-shield subassembly, in accordance with an embodiment of the present invention. The upper left drawing shows the front view of the lower feed-shield subassembly. The upper right drawing shows a cross-sectional view of the lower feed-shield subassembly along a vertical cutting plane AA and a horizontal cutting plane BB. The lower left drawing shows the bottom view of the lower feed-shield subassembly, illustrating in detail the bottom of RF shield 810. Note that the ridges on RF shield 810 provide space for components on the underlying FPGA board. The lower right drawing is a detailed drawing of a section where glue is applied to attach the sub-reflector to the spacer and the waveguide tube.

Recall the previously shown FIGS. 2A and 2B where the radio is mounted on a pole via a mounting unit. The mounting unit not only secures the radio to the pole, but also enables easy and accurate alignment of the antenna reflectors, which is important to ensure the best performance of the link. In general, the mounting unit includes a pole-mounting bracket and a radio-mounting bracket. The pole-mounting bracket is mounted to a pole, which can be located on a rooftop or any other elevated location in order to ensure a clear line of sight between paired radios. Moreover, the mounting location should have a clear view of the sky to ensure proper GPS operation. For safety, the mounting point should be at least one meter below the highest point on the structure, or if on a tower, at least three meters below the top of the tower. The radio-mounting bracket is mounted to the backside of the radio, and is coupled to the pole-mounting bracket.

Figure 9A:
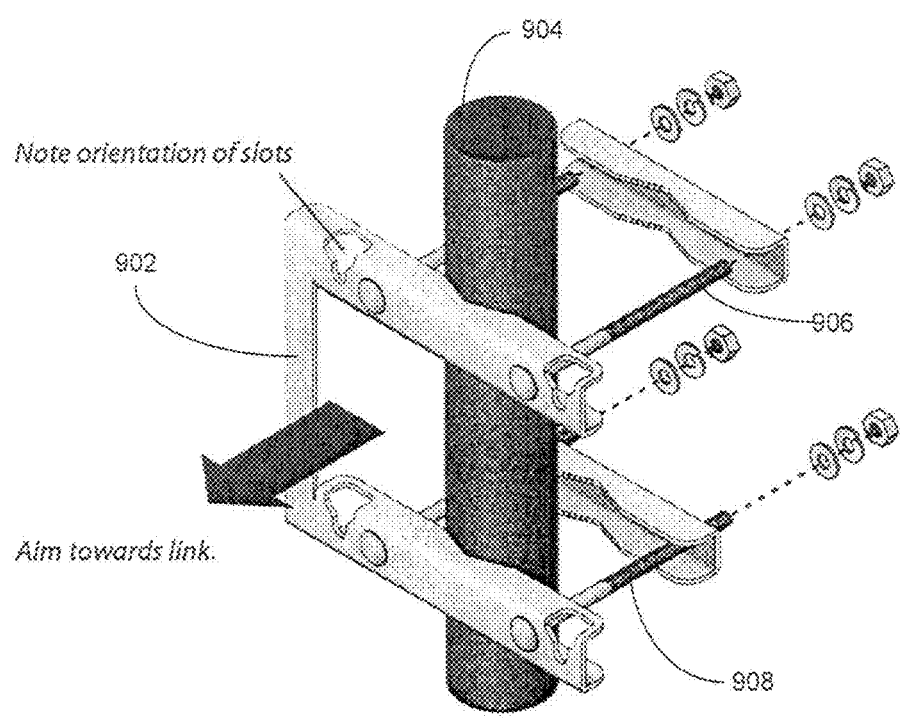
FIG. 9A presents the assembly view of the pole-mounting bracket mounted on a pole, in accordance with an embodiment of the present invention.

FIG. 9A presents the assembly view of the pole-mounting bracket mounted on a pole, in accordance with an embodiment of the present invention. In FIG. 9A, pole mounting bracket 902 is mounted onto a pole 904 using a number of bolts, such as bolts 906 and 908. Pole-mounting bracket 902 can be configured to fit poles of various sizes. In one embodiment, pole-mounting bracket 902 accommodates poles with diameters between 2 and 4 inches. The arrow in the figure indicates the direction in which the radio antenna faces, that is the direction to the other radio. Note that while aligning the antenna, a user may adjust the position of the antenna by adjusting the position (including elevation and direction) of pole-mounting bracket 902 on pole 904.

FIG. 9B presents the assembly view of the radio-mounting bracket subassembly, in accordance with an embodiment of the present invention. In FIG. 9B, radio-mounting bracket subassembly 900 includes a number of brackets and a number of connecting components (such as screws and pins). More specifically, radio-mounting bracket subassembly 900 includes a pivot bracket 912, an azimuth (AZ)-adjustment bracket 914, a left elevation-adjustment bracket 916, and a right elevation-adjustment bracket 918. Pivot bracket 912 provides pivot points for all other adjustment brackets. AZ-adjustment bracket 914 enables the fine-tuning of the azimuth of the antenna. More specifically, a user can adjust the azimuth of the antenna by adjusting the position of an AZ-adjustment bolt 920 coupled to AZ-adjustment bracket 914. Similarly, elevation-adjustment brackets 916 and 918 enable the fine-tuning of the elevation of the antenna. A user can adjust the elevation of the antenna by adjusting the position of an elevation-adjustment bolt 922. In one embodiment, the azimuth and the elevation of the antenna can be adjusted within a range of ±10°. A number of adjustment pins, such as adjustment pins 924 and 926, fit to the adjustment bolts, also assist the fine-tuning of the antenna orientation. Radio-mounting bracket subassembly 900 also includes a number of lock bolts, such as lock bolt 928. In one embodiment, radio-mounting bracket subassembly 900 includes 8 lock bolts. These lock bolts are loosened before and during the alignment process. After the radio has been sufficiently aligned with the radio on the other side, these lock bolts are tightened to lock the alignment. In addition, radio-mounting bracket subassembly 900 includes four flange screws, such as screw 930. These flange screws are used to couple radio-mounting bracket subassembly 900 to pole mounting bracket 902.

Figure 9C:
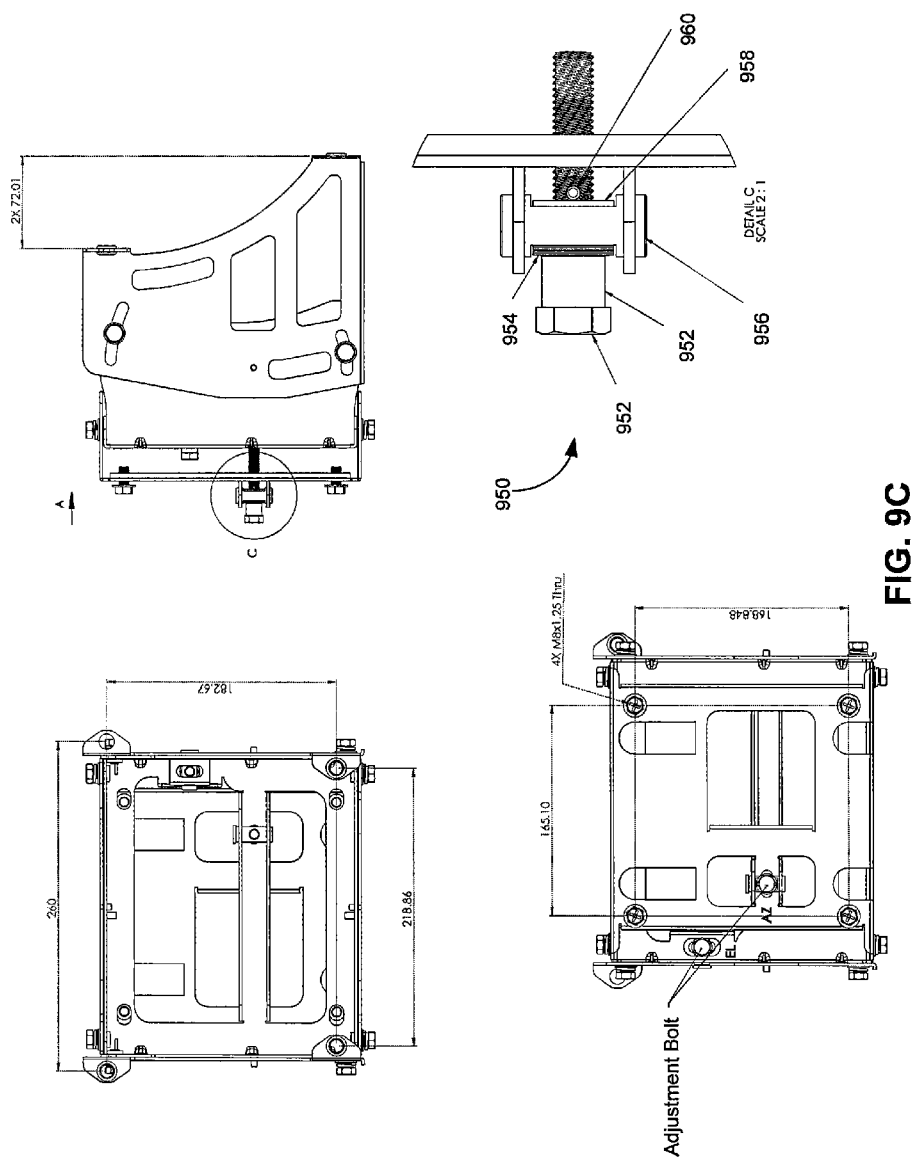
FIG. 9C presents more detailed mechanical drawings of the radio-mounting bracket, in accordance with an embodiment of the present invention.

FIG. 9C presents more detailed mechanical drawings of the radio-mounting bracket, in accordance with an embodiment of the present invention. The upper left drawing shows the back view (viewed from the side of the radio) of the radio-mounting bracket, the lower left drawing shows the front view of the radio-mounting bracket, the upper right drawing shows the side view of the radio-mounting bracket, and the lower right drawing shows a detailed drawing of an adjustment bolt assembly. Note that the assemblies for the AZ-adjustment bolt and the elevation-adjustment bolt are similar. In FIG. 9C, an adjustment bolt assembly 950 includes an adjustment bolt 952, a disk spring 954, an adjustment pin 956 with a through hole, a flat washer 958, and slotted spring pin 960.

Figure 9D:
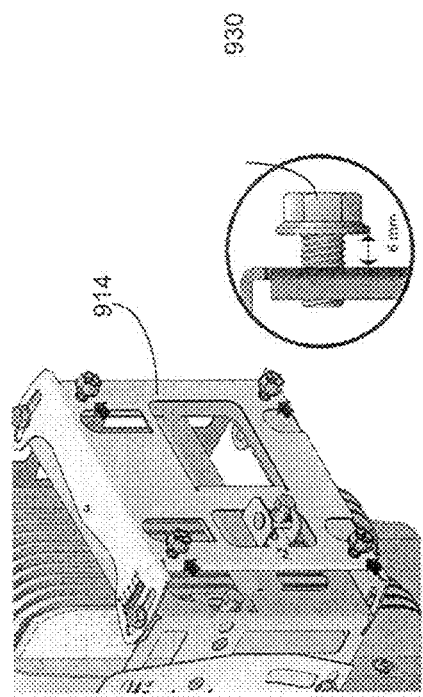
FIG. 9D presents a diagram illustrating the radio-mounting bracket mounted to a radio, in accordance with an embodiment of the present invention.
Figure 9D:
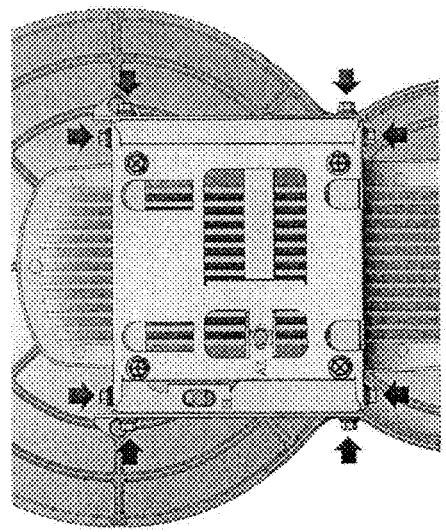

FIG. 9D presents a diagram illustrating the radio-mounting bracket mounted to a radio, in accordance with an embodiment of the present invention. The left drawing is the back view. The arrows in the left drawing point to the lock bolts. The right drawing is an angled view. The zoomed-in image shows that a 6 mm gap is needed between the head of flange screw 930 and AZ-adjustment bracket 914.

Figure 9E:
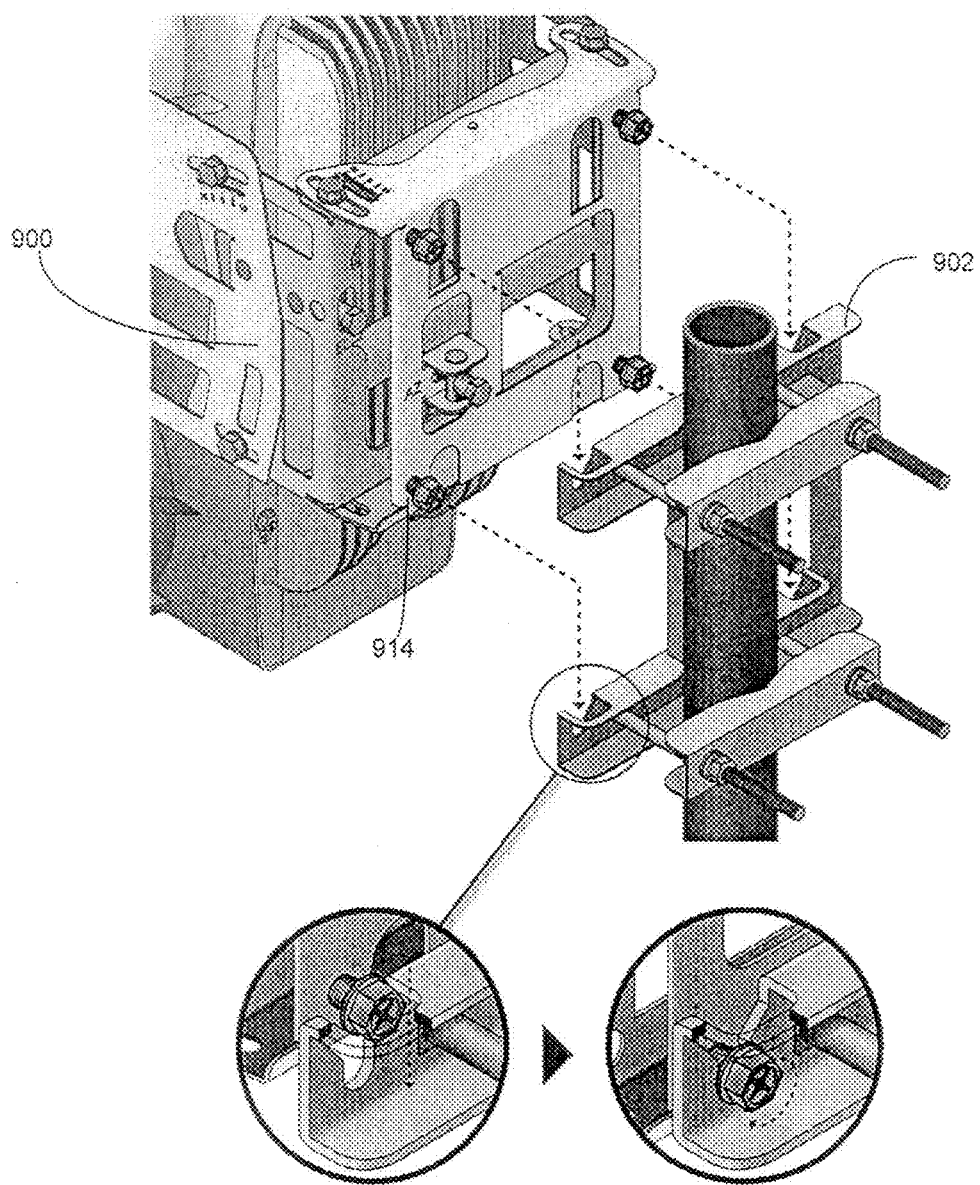
FIG. 9E presents a diagram illustrating the coupling between the radio-mounting bracket and the pole-mounting bracket, in accordance with an embodiment of the present invention.

FIG. 9E presents a diagram illustrating the coupling between the radio-mounting bracket and the pole-mounting bracket, in accordance with an embodiment of the present invention. From FIG. 9E, one can see that the radio-mounting bracket subassembly 900 can be attached to pole mounting bracket 902 by seating the flange screws on AZ-adjustment bracket 914 to corresponding notches on pole mounting bracket 902. Note that the flange screws can be later tightened to ensure that the radio-mounting bracket subassembly 900, and thus the radio, is securely attached to pole mounting bracket 902.

System Configuration

The 24 GHz license-free operating frequency of the radio system makes it a preferred choice for deployment of point-to-point wireless links, such as a wireless backhaul, because there is no need to obtain an FCC (Federal Communications Commission) license. The unique design of the high-gain reflector antenna provides long reachability (up to 13 Km in range) of the radio system. Moreover, the radio system can operate in both Frequency Division Duplex (FDD) and Hybrid Division Duplex (HDD) modes, thus providing the radio system with unparalleled speed and spectral efficiency, with data throughput above 1.4 Gbps. Note that HDD provides the best of both worlds, combining the latency performance of FDD with the spectral efficiency of Time Division Duplex (TDD).

Figure 10A:
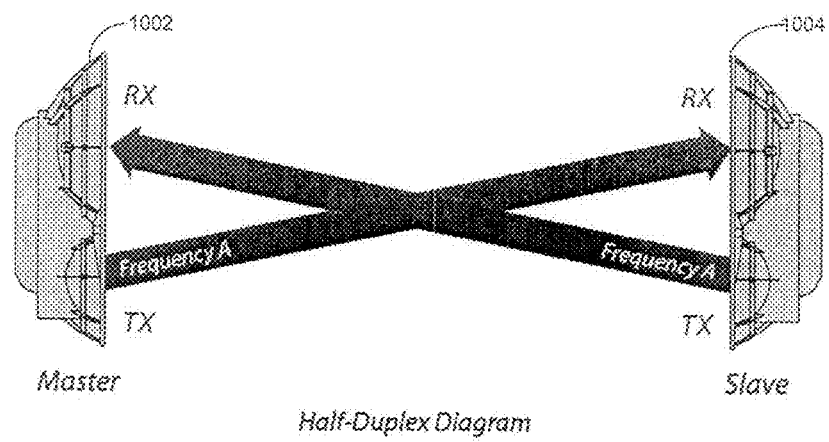
FIG. 10A presents a diagram illustrating the radio system operating in half-duplex mode, in accordance with an embodiment of the present invention.

During operation, the radio system can be configured for half-duplex operation (which is the default setting) and full-duplex operation. FIG. 10A presents a diagram illustrating the radio system operating in half-duplex mode, in accordance with an embodiment of the present invention. In FIG. 10A, radio system 1000 includes two radios, a master radio 1002 and a slave radio 1004. Note that master and slave radios can be similar radios with different configurations. In the example shown in FIG. 10A, the lower antenna reflectors are used for transmitting (TX) purposes, whereas the upper antenna reflectors are used for receiving (RX) purposes. When the system is configured to operate in the half-duplex mode, the TX and RX frequencies can be either the same or different to suit local interference. Note that the half-duplex mode allows communication in one direction at a time, alternating between transmission and reception. As a result, the half-duplex operation provides more frequency planning options at the cost of higher latency and throughput.

Figure 10B:
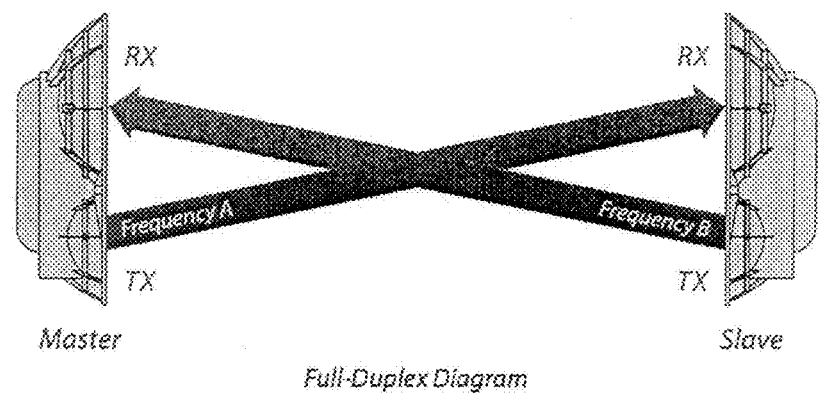
FIG. 10B presents a diagram illustrating the radio system operating in full-duplex mode, in accordance with an embodiment of the present invention.

FIG. 10B presents a diagram illustrating the radio system operating in full-duplex mode, in accordance with an embodiment of the present invention. When operating in the full-duplex mode, the TX and RX frequencies should be different, thus allowing communication in both directions simultaneously. The full-duplex operation may provide higher throughput and lower latency.

In one variation, high speed and lower latency may be obtained with the radios configured as a full-duplex system using Frequency Division Duplexing (FDD). The data streams generated by the radios are simultaneously transferred across the wireless link. The transmitter and receiver are running concurrently in time. Because of the trade-off between bandwidth resources and propagation conditions, this approach is typically reserved for links in areas where installations are in clear line-of-sight conditions and free of reflected energy such as that generated by heavy rain or intermediate objects. Installations that are subject to Fresnel reflections or highly scattered environments may experience some level of degradation at great ranges.

Links that are installed in environments that are highly reflective or subject to considerable scattering due to heavy rain or foliage loss may be better suited to half-duplex configurations. In this case the frequency and bandwidth resources are shared on a Time Division Duplexing (TDD) basis, and the system can accept higher levels of propagation distortion. The trade-offs may include reduced throughput and slightly higher latency.

In some variations, the radio system is configured with the ability to manage time and bandwidth resources, similar to other systems utilizing different modulation schemes that are scaled according to the noise, interference, and quality of the propagation channel. The radio system also automatically scales its modulation based on channel quality but has the ability to be reconfigured from a time/bandwidth perspective to allow for the best possible performance. In many regards the suitability of the duplexing scheme needs to be taken into account based on the ultimate goals of the user. Just as channel conditions have an effect on the modulation scheme selection, there are effects on duplexing modes to consider as well.

When deploying the radio systems for establishing wireless communication links, various configurations can be used. For example, the first configuration is for point-to-point backhaul, where two radios (one configured as master and one configured as slave) are used to establish a point-to-point link as shown in FIGS. 10A and 10B.

Figure 11A:
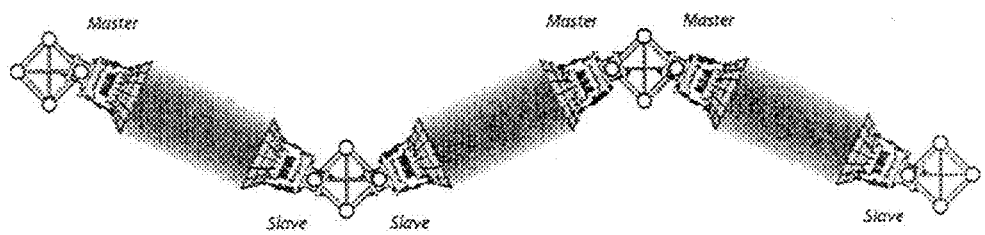
FIG. 11A presents a diagram illustrating a radio system in a daisy chain configuration, in accordance with an embodiment of the present invention.
Figure 11B:
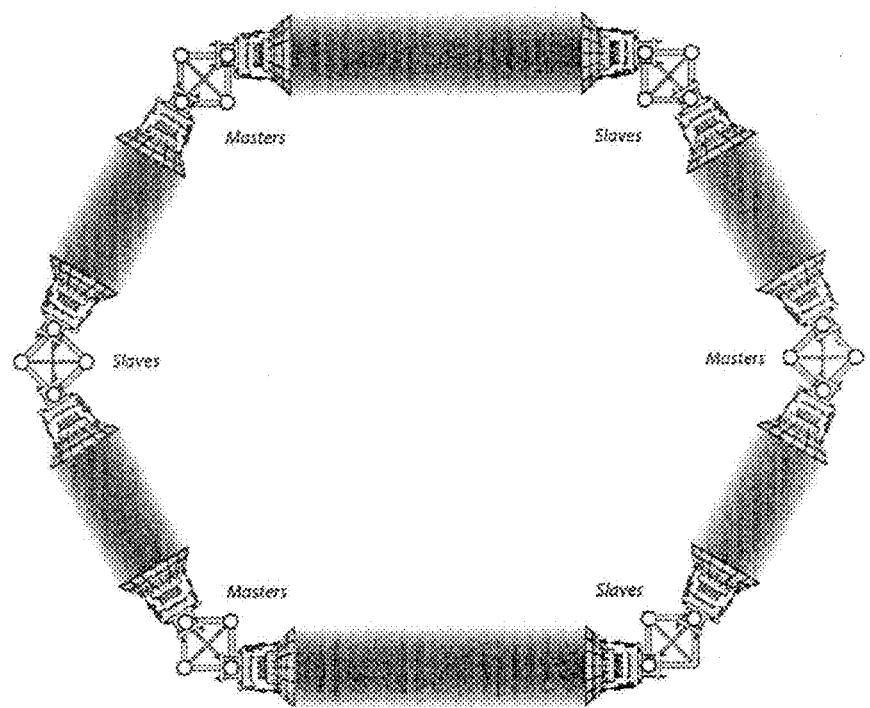
FIG. 11B presents a diagram illustrating a radio system in a ring configuration, in accordance with an embodiment of the present invention.

FIG. 11A presents a diagram illustrating a radio system in a daisy chain configuration, in accordance with an embodiment of the present invention. As shown in FIG. 11A, in a daisy chain configuration, multiple radios are used to extend the distance of a link, like a relay from point to point to point. Note that the radios in the same node need to have the same master/slave configuration. FIG. 11B presents a diagram illustrating a radio system in a ring configuration, in accordance with an embodiment of the present invention. As shown in FIG. 11B, in a ring configuration, multiple radios are used to form redundant paths. When configured as a ring, if one link goes down, the other links have an alternative route available. For each link, one radio is configured as master and the other one is configured as slave. Due to the narrow bandwidth of the radios, co-location interference is not a concern in most cases. It is possible to co-locate multiple radios if they are pointed in different directions. If the radios are back-to-back, it is even possible to use the same frequency. It is recommended to use different frequencies for adjacent radios. Note that co-located radios should have the same master/slave configuration.

Before mounting the radios onto poles, the user should configure the paired radios. The radio configurations include, but are not limited to: operating mode (master or slave) of the radio, duplex mode (full-duplex or half-duplex of the link), TX and RX frequencies, and data modulation schemes. Detailed descriptions of the configuration settings are included in the following section.

The installation steps include connecting Ethernet cables to the data and configuration ports, configuring the settings of the radio using a configuration interface, disconnecting the cables to move the radios to mounting sites, reconnecting at the mounting sites, mounting the radios, and establishing and optimizing the RF link.

Figure 12A:
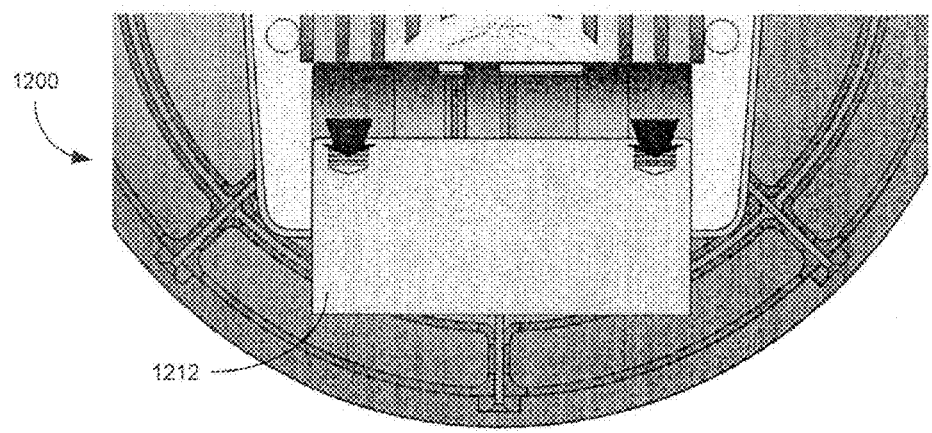
FIG. 12A presents a diagram illustrating the port cover being slid off the backside of the radio to expose various ports, in accordance with an embodiment of the present invention.

FIG. 12A presents a diagram illustrating the port cover being slid off the backside of the radio to expose various ports, in accordance with an embodiment of the present invention. In FIG. 12A, one can slide off a port cover 1212 from the backside of the radio by pressing down on the indicator arrows.

Figure 12B:
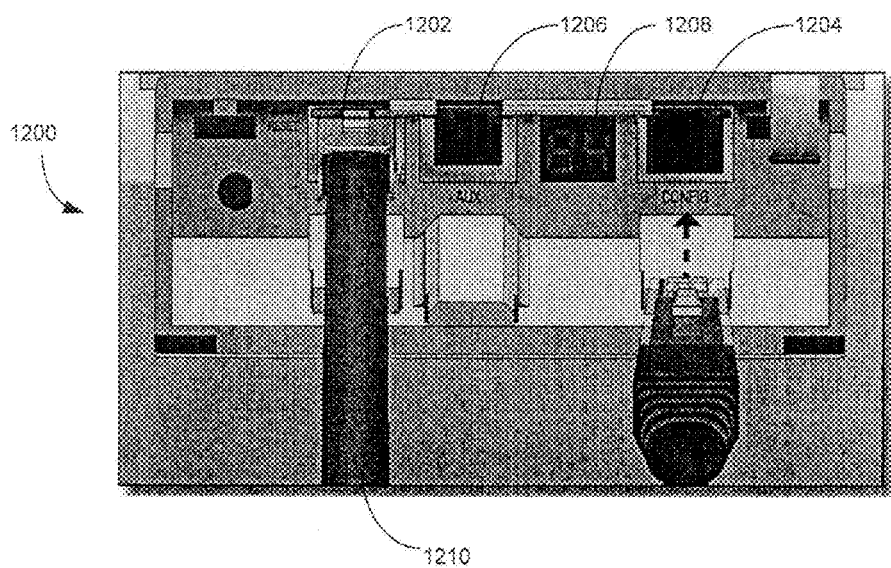
FIG. 12B presents a diagram illustrating the ports on the backside of a radio, in accordance with an embodiment of the present invention.

FIG. 12B presents a diagram illustrating the ports on the backside of a radio, in accordance with an embodiment of the present invention. In FIG. 12B, radio 1200 includes a data port 1202, a configuration port 1204, an auxiliary port 1206, and an LED display 1208. Data port 1202 not only enables upload/download of link data, but also provides power to the radio via power-over-Ethernet (PoE). During operation, an Ethernet cable, such as cable 1210, can be used to couple data port 1202 with a PoE adapter, which in turn couples to a power source. Configuration port 1204 enables communication between a user computer and the CPU of the radio, thus enabling the user to configure the settings that govern the operations of the radio. In one embodiment, an Ethernet cable can be used to couple configuration port 1204 with a computer.

Auxiliary port 1206 includes an RJ-12 connector. In one embodiment, auxiliary port 1206 can be coupled to a listening device, such as a headphone, to enable alignment of the antennas by listening to an audio tone. More specifically, while aligning the pair of antennas, one can listen to the audio tone via the listening device coupled to auxiliary port 1206; the higher the pitch, the stronger the signal strength, and thus the better the alignment. To ensure the best tuning result, it is recommended that the user iteratively adjusts the AZ and elevation of the pair of radios one by one, starting with the slave radio, until a symmetric link (with received signal levels within 1 dB of each other) is achieved. This ensures the best possible data rate between the paired radios. Note that adjusting the AZ and elevation of a radio can be achieved by adjusting the corresponding AZ and elevation bolts, as discussed in the previous section.

In addition to using the audio tone, the user can also align the paired radios based on digital values displayed by LED display 1208. More specifically, LED display 1208 displays the power level of the received signal. In one embodiment, values on LED display 1208 are displayed in negative dBm. For example, a number 61 represents a received signal level of −61 dBm. Hence, lower values indicate a stronger received signal level. While aligning the paired radios, the user can observe LED display 1208 to monitor the received signal strength. For best alignment results, a pair of installers should be used with one adjusting the AZ and elevation of a radio at one end of the link, while the other installer reports the received signal level at the other end of the link.

Figure 12C:
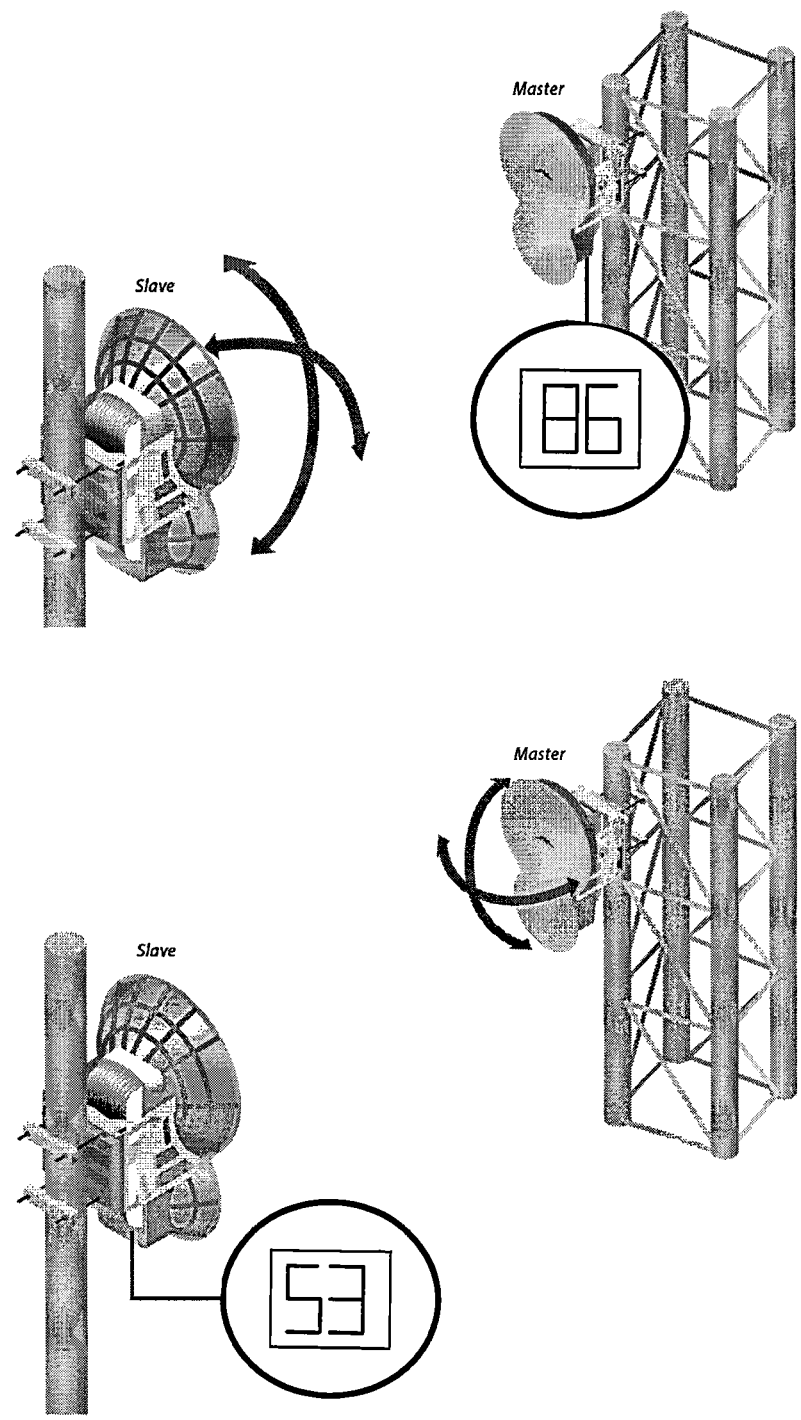
FIG. 12C presents a diagram illustrating the fine-tuning of the wireless link, in accordance with an embodiment of the present invention.

FIG. 12C presents a diagram illustrating the fine-tuning of the wireless link, in accordance with an embodiment of the present invention. The upper drawing shows that one installer at the end of the slave radio sweeps the AZ-adjustment bolt and then sweeps the elevation-adjustment bolt (as indicated by the arrows in the drawing) until the other installer sees the strongest received signal level displayed on the LED display of the master radio. The lower drawing shows that the installer at the end of the master radio sweeps the AZ-adjustment bolt and then sweeps the elevation-adjustment bolt (as indicated by the arrows in the drawing) until the other installer sees the strongest received signal level displayed on the LED display of the slave radio. During alignment, the installers alternate adjustments between the paired radios until a symmetric link is achieved. Subsequently, the installers can lock the alignment on both radios by tightening all eight lock bolts on the alignment bracket. The installers should observe the LED display on each radio to ensure that the value remains constant. If the LED value changes during the locking process, the installers can loosen the lock bolts, finalize the alignment of each radio again, and retighten the lock bolts.

The radio configurations include, but are not limited to: operating mode (master or slave) of the radio, duplex mode (full-duplex or half-duplex of the link), TX and RX frequencies, and data modulation schemes. Detailed descriptions of the configuration settings are included in the following section.

Configuration Interface

In addition to hardware, the radio system may further includes a configuration interface, which is an operating system capable of powerful wireless and routing features, built upon a simple and intuitive user interface foundation. In one embodiment, a user can access the configuration interface for easy configuration and management via a web browser. Note that the configuration interface can be accessed in two different ways. More specifically, one can use the direct coupling to the configuration port to achieve out-of-band management. In addition, in-band management is available via the local data port or the data port at the other end of the link.

In some variations, before accessing the communication interface, the user needs to make sure that the host machine is connected to the LAN that is connected to the configuration port on the radio being configured. The user may also need to configure the Ethernet adapter on the host system with a static IP address, such as one on the 192.168.1.x subnet (for example, 192.168.1.100). Subsequently, the user can launch the web browser, and type http://192.168.1.20 in the address field and press enter (PC) or return (Mac). In one embodiment, a login window appears, prompting the user for a username and password. After a standard login process, the configuration interface will appear, allowing the user to customize radio settings as needed.

Figure 13:
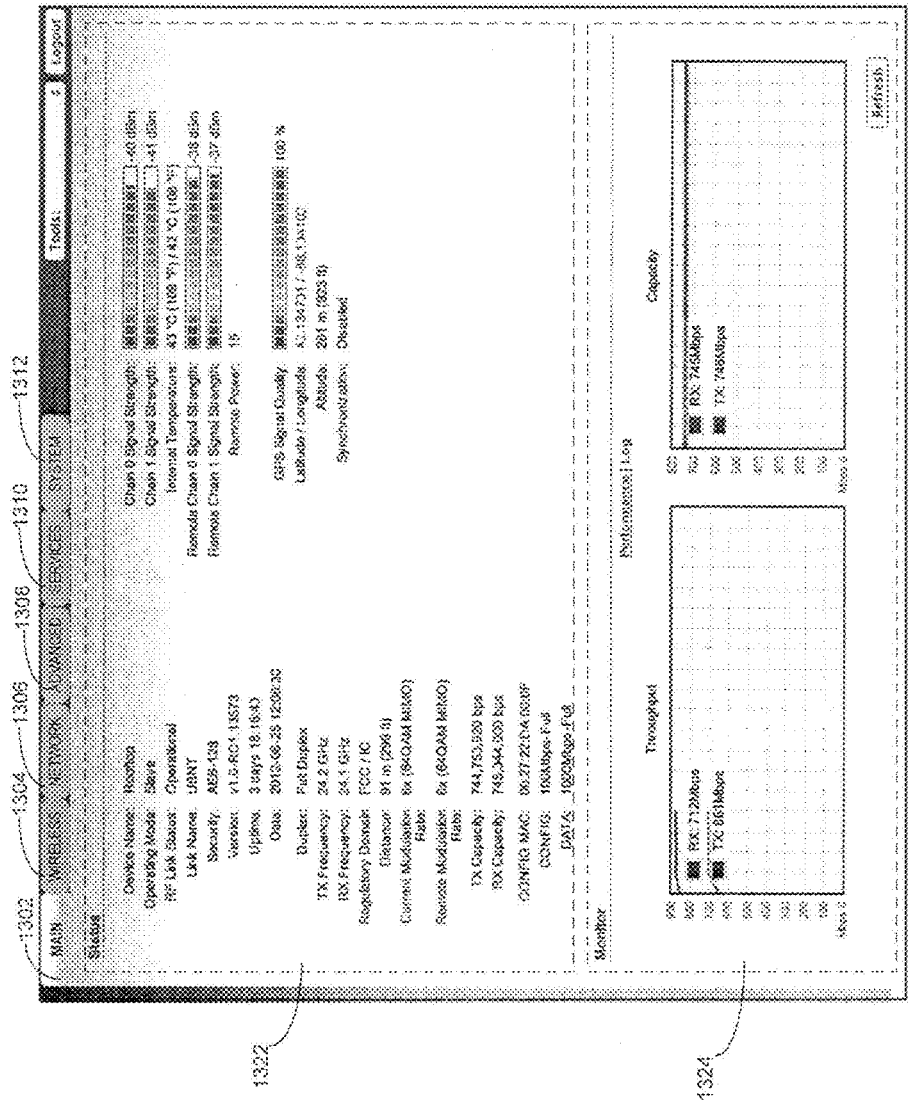
FIG. 13 presents a diagram illustrating an exemplary view of the configuration interface, in accordance with an embodiment of the present invention.

FIG. 13 presents a diagram illustrating an exemplary view of the configuration interface, in accordance with an embodiment of the present invention. In FIG. 13, configuration interface 1300 includes six main tabs, each of which provides a web-based management page to configure a specific aspect of the radio. More specifically, configuration interface 1300 includes a main tab 1302, a wireless tab 1304, a network tab 1306, an advanced tab 1308, a services tab 1310, and a system tab 1312.

In some variations, the main tab 1302 displays device status, statistics, and network monitoring links. Wireless tab 1304 configures basic wireless settings, including the wireless mode, link name, frequency, output power, speed, RX Gain, and wireless security. Network tab 1306 configures the management network settings, Internet Protocol (IP) settings, management VLAN, and automatic IP aliasing. Advanced tab 1308 provides more precise wireless interface controls, including advanced wireless settings and advanced Ethernet settings. Services tab 1310 configures system management services: ping watchdog, Simple Network Management Protocol (SNMP), servers (web, SSH, Telnet), Network Time Protocol (NTP) client, dynamic Domain Name System (DDNS) client, system log, and device discovery. System tab 1312 controls system maintenance routines, administrator account management, location management, device customization, firmware update, and configuration backup. The user may also change the language of the web management interface under system tab 1312.

As shown in FIG. 13, when main tab 1302 is active, configuration interface 1300 presents two display areas, an area 1322 for displaying various status information, and an area 1324 for displaying outputs of monitoring tools.

In the example shown in FIG. 13, area 1322 displays a summary of link status information, current values of the basic configuration settings, and network settings and information. Items displayed in area 1322 include, but are not limited to: device name, operating mode, RF link status, link name, security, version, uptime, date, duplex, TX frequency, RX frequency, regulatory domain, distance, current modulation rate, remote modulation rate, TX capacity, RX capacity, CONFIG MAC, CONFIG, data, chain 0/1 signal strength, internal temperature, remote chain 0/1 signal strength, remote power, GPS signal quality, latitude/longitude, altitude, and synchronization.

Device name displays the customizable name or identifier of the device. The device name (also known as the host name) is displayed in registration screens and discovery tools. Operating mode displays the mode of the radio: slave, master, or reset. RF link status displays the status of the radio: RF off, syncing, beaconing, registering, enabling, listening, or operational. Link name displays the customizable name or identifier of the link. Security displays the encryption scheme, where AES-128 is enabled at all times.

Version displays the software version of the radio configuration interface. Uptime is the total time the device has been running since the latest reboot (when the device was powered up) or software upgrade. This time is displayed in days, hours, minutes, and seconds. Date displays the current system date and time in YEAR-MONTH-DAY HOURS:

MINUTES:SECONDS format. The system date and time are retrieved from the Internet using NTP (Network Time Protocol). The NTP client is enabled by default on the Services tab. The radio does not have an internal clock, and the date and time may be inaccurate if the NTP client is disabled or the device is not connected to the Internet.

Duplex displays full-duplex or half-duplex. As discussed in the previous section, full-duplex mode allows communication in both directions simultaneously, and half-duplex mode allows communication in one direction at a time, alternating between transmission and reception.

TX frequency displays the current transmit frequency. The radio uses the radio frequency specified to transmit data. RX frequency displays the current receive frequency. The radio uses the radio frequency specified to receive data. Regulatory domain displays the regulatory domain (FCC/IC, ETSI, or Other), as determined by country selection. Distance displays the distance between the paired radios.

Current modulation rate displays the modulation rate, for example: 6× (64QAM MIMO), 4× (16QAM MIMO), 2× (QPSK MIMO), 1× (QPSK SISO), and ¼× (QPSK SISO). Note that if Automatic Rate Adaptation is enabled on the wireless tab, then current modulation rate displays the current speed in use and depends on the maximum modulation rate specified on the wireless tab and current link conditions. Remote modulation rate displays the modulation rate of the remote radio: 6× (64QAM MIMO), 4× (16QAM MIMO), 2× (QPSK MIMO), 1× (QPSK SISO), and ¼× (QPSK SISO).

TX capacity displays the potential TX throughput, how much the radio can send, after accounting for the modulation and error rates. RX capacity displays the potential RX throughput, how much the radio can receive, after accounting for the modulation and error rates.

CONFIG MAC displays the MAC address of the configuration port. CONFIG displays the speed and duplex of the configuration port. Data displays the speed and duplex of the data port. Chain 0/1 signal strength displays the absolute power level (in dBm) of the received signal for each chain. Changing the RX Gain on the wireless tab does not affect the signal strength values displayed on the main tab. However, if "overload" is displayed to indicate overload condition, decrease the RX Gain.

Internal temperature displays the temperatures inside the radio for monitoring. Remote chain 0/1 signal strength displays the absolute power level (in dBm) of the received signal for each chain of the remote radio. Remote power displays the maximum average transmit output power (in dBm) of the remote radio. GPS signal quality displays GPS signal quality as a percentage value on a scale of 0-100%. Latitude and longitude are displayed based on GPS tracking, reporting the device's current latitude and longitude. In some variations, clicking the link opens the reported latitude and longitude in a browser, for example, using Google Maps™ (registered trademark of Google Inc. of Menlo Park, Calif.). Altitude is displayed based on GPS tracking, reporting the device's current altitude relative to sea level. Synchronization displays whether the radio uses GPS to synchronize the timing of its transmissions. In some variation, the option of synchronization using GPS maybe disabled. In some variation, the radio can be configured without a GPS receiver or other GPS tracking electronics.

Area 1324 displays outputs of two monitoring tools that are accessible via the links on the main tab, performance and log. The default is performance, which is displayed when the main tab is opened, as shown in FIG. 13. In FIG. 13, area 1324 displays two charts, the throughput chart and the capacity chart. The throughput chart displays the current data traffic on the data port in both graphical and numerical form. The capacity chart displays the potential data traffic on the data port in both graphical and numerical form. For both charts the chart scale and throughput dimension (Bps, Kbps, Mbps) change dynamically depending on the mean throughput value, and the statistics are updated automatically. If there is a delay in the automatic update, one can click the refresh button to manually update the statistics. When the log link is selected and logging is enabled, area 1324 displays all registered system events. By default, logging is not enabled.

Figure 14:
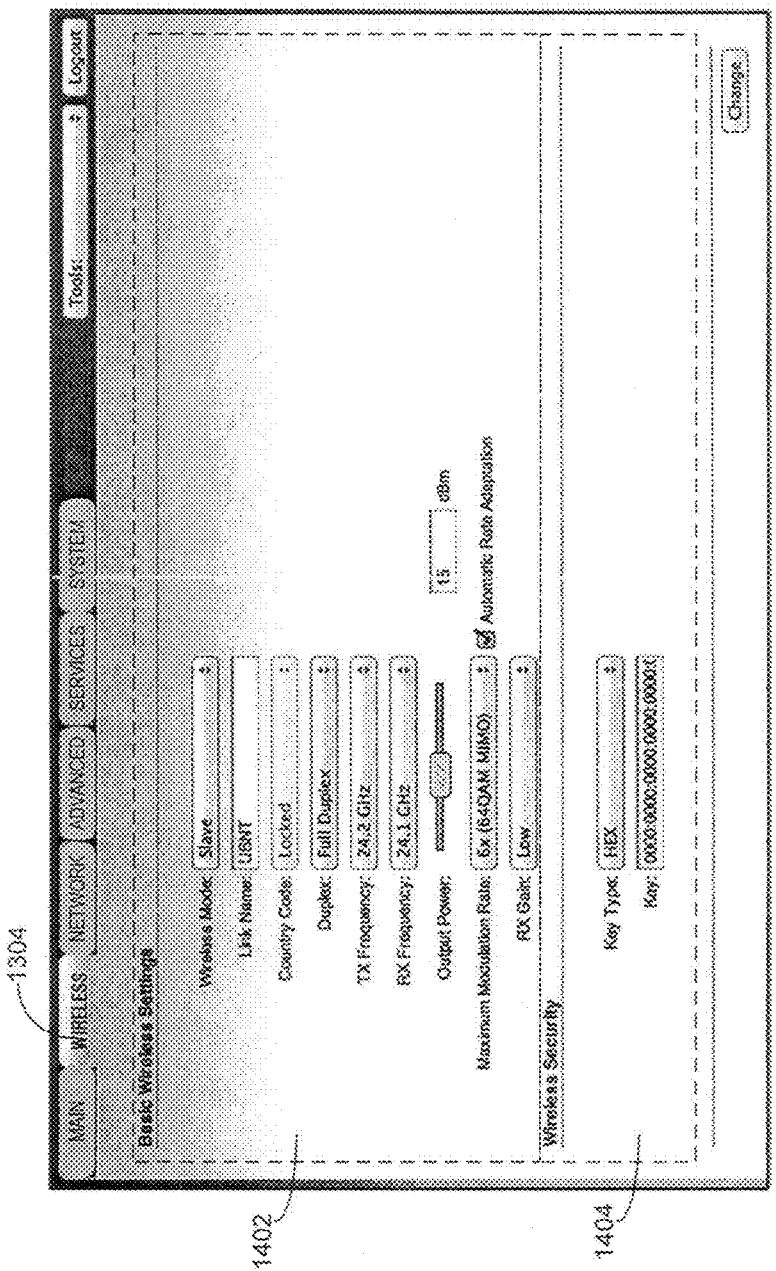
FIG. 14 presents a diagram illustrating an exemplary view of the configuration interface, in accordance with an embodiment of the present invention.

FIG. 14 presents a diagram illustrating an exemplary view of the configuration interface, in accordance with an embodiment of the present invention. As shown in FIG. 14, when wireless tab 1304 is active, two display areas are presented to the user, including an area 1402 for displaying basic wireless settings and an area 1404 for displaying wireless security settings. The change button allows the user to save or test the changes. When a user clicks on the change button, a new message appears (not shown in FIG. 14), providing the user with three options. The user can immediately save the changes by clicking on an apply button. To test the changes, the user can click a test button. To keep the changes, click the apply button. If the user does not click apply within 180 seconds (the countdown is displayed), the radio times out and resumes its earlier configuration. To cancel the changes, the user can click the discard button.

In some variations, the basic wireless settings include, but are not limited to: wireless mode, link name, country code, duplex mode, frequencies, output power, speed, and gain. The wireless mode can be set as master or slave. By default, the wireless mode is set as slave. For paired radios, one needs to be configured as master because each point-to-point link must have one master. Link name is the name for the point-to-point link. A user can enter a selected name in the field of the link name.

Because each country has its own power level and frequency regulations, to ensure that the radio operates under the necessary regulatory compliance rules, the user may select the country where the radio will be used. The frequency settings and output power limits will be tuned according to the regulations of the selected country. In some variations, the U.S. product versions are locked to the U.S. country code, as illustrated in FIG. 14, to ensure compliance with government regulations.

In this example, the duplex field includes two selections: half-duplex or full-duplex. The TX frequency field allows the user to select a transmit frequency. Note that the TX frequency on the master should be used as the RX frequency on the slave, and vice versa. The RX frequency field allows a user to select a receive frequency. The output power field defines the maximum average transmit output power (in dBm) of the radio. A user can use the slider or manually enter the output power value. The transmit power level maximum is limited according to the country regulations. The maximum modulation rate field displays either the maximum modulation rate or the modulation rate. Note that higher modulations support greater throughput but generally require stronger RF signals and higher signal-to-noise ratio (SNR). In some variations, by default, automatic rate adaptation is enabled, as shown in FIG. 14, and the maximum modulation rate is displayed. This allows the radio to automatically adjust the modulation rate to changing RF signal conditions. Under certain conditions, a user may prefer to lock the maximum modulation rate to a lower setting to improve link performance. When automatic rate adaptation is disabled, the modulation rate is displayed, and the user can lock the modulation rate to a selected setting. In some variations, there are five possible modulation choices: 6× (64QAM MIMO), 4× (16QAM MIMO), 2× (QPSK MIMO), 1× (QPSK SISO), and ¼× (QPSK SISO). The RX Gain field allows the user to select the appropriate gain for the RX antenna: high (default) or low. One can select RX Gain as low if the link is very short or being tested to prevent the signal from being distorted.

In FIG. 14, area 1404 displays wireless security settings, where 128-bit, AES (Advanced Encryption Standard) encryption is used at all times. The security settings include a key type field, which specifies the character format (HEX or ASCII), and a key field, which specifies the format of the MAC address.

Note that the same wireless settings should be applied to the radio at the other end of the point-to-point link with the exception of the wireless mode (one needs to be configured as master and the other as slave), and the TX and RX frequencies (the TX frequency on the master should be used as the RX frequency on the slave, and vice versa).

Figure 15:
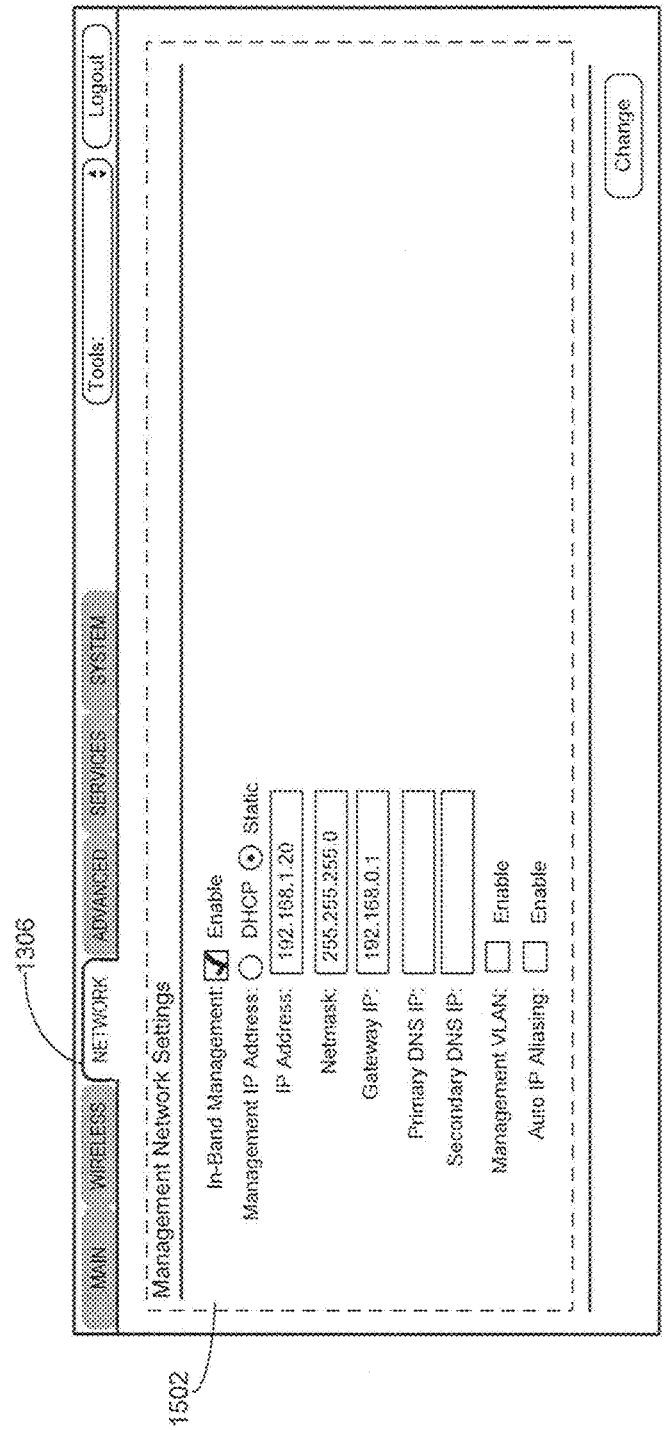
FIG. 15 presents a diagram illustrating an exemplary view of the configuration interface, in accordance with an embodiment of the present invention.

FIG. 15 presents a diagram illustrating an exemplary view of the configuration interface, in accordance with an embodiment of the present invention. As shown in FIG. 15, when network tab 1306 is active, a display area 1502 is presented to the user, which allows the user to configure settings for the management network. The change button allows a user to save or test the changes.

The in-band management field allows a user to enable or disable in-band management, which is available via the data port of the local radio or the data port of the remote radio. In-band management is enabled by default, as shown in FIG. 15. Out-of-band management is available via the configuration port, which is enabled by default. The configuration port and the in-band management share the default IP address of 192.168.1.20.

The management IP address field includes two choices: DHCP or static. When DHCP is selected, the local DHCP server assigns a dynamic IP address, gateway IP address, and DNS address to the radio. It is recommended to choose the static option, where a static IP address is assigned to the radio, as shown in FIG. 15.

When a static IP address is selected, area 1502 displays the following fields: IP address, netmask, gateway IP, primary DNS IP, secondary DNS IP, management VLAN, and auto IP aliasing. The IP address field specifies the IP address of the radio. This IP will be used for device management purposes. When the netmask is expanded into its binary form, the netmask field provides a mapping to define which portions of the IP address range are used for the network devices and which portions are used for host devices. The netmask defines the address space of the radio's network segment. For example, in FIG. 15, the netmask field displays 255.255.255.0 (or "/24"), which is commonly used on many Class C IP networks.

The gateway IP is the IP address of the host router, which provides the point of connection to the Internet. This can be a DSL modem, cable modem, or WISP gateway router. The radio directs data packets to the gateway if the destination host is not within the local network. The primary DNS IP specifies the IP address of the primary DNS (Domain Name System) server. The secondary DNS IP specifies the IP address of the secondary DNS server. Note that this entry is optional and used only if the primary DNS server is not responding.

The management VLAN field allows the user to enable the management VLAN, which results in the system automatically creating a management Virtual Local Area Network (VLAN). In some variations, when management VLAN is enabled, a VLAN ID filed appears (not shown in the figure) to allow the user to enter a unique VLAN ID from 2 to 4094. When the auto IP aliasing option is enabled, the system automatically generates an IP address for the corresponding WLAN/LAN interface. The generated IP address is a unique Class B IP address from the 169.254.X.Y range (netmask 255.255.0.0), which is intended for use within the same network segment only. The auto IP always starts with 169.254.X.Y, with X and Y being the last two octets from the MAC address of the radio. For example, if the MAC address is 00:15:6 D:A3:04:FB, then the generated unique auto IP will be 169.254.4.251. The hexadecimal value, FB, converts to the decimal value, 251. This auto IP aliasing setting can be useful because the user can still access and manage devices even if the user loses, misconfigures, or forgets their IP addresses. Because an auto IP address is based on the last two octets of the MAC address, the user can determine the IP address of a device if he knows its MAC address.

Figure 16:
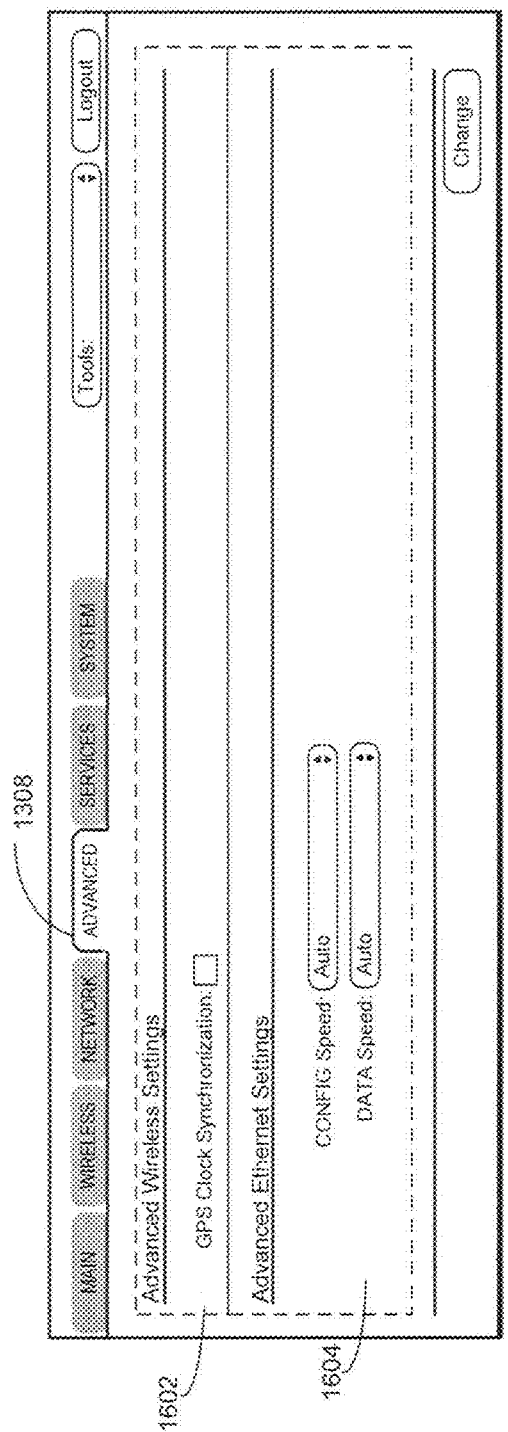
FIG. 16 presents a diagram illustrating an exemplary view of the configuration interface, in accordance with an embodiment of the present invention.

FIG. 16 presents a diagram illustrating an exemplary view of the configuration interface, in accordance with an embodiment of the present invention. As shown in FIG. 16, when advanced tab 1308 is active, display areas 1602 and 1604 are presented to the user, which allow the user to configure advanced wireless and Ethernet settings, respectively. Display area 1602 includes a GPS clock synchronization field, which allows the user to enable or disable the use of GPS to synchronize the timing of its transmissions. By default, option is disabled, as shown in FIG. 16. Display area 1604 includes a CONFIG speed field and a data speed field. The CONFIG speed field allows the user to set the speed of the configuration port. By default, this option is auto, as shown in FIG. 16, where the radio automatically negotiates transmission parameters, such as speed and duplex, with its counterpart. A user can also manually specify the maximum transmission link speed and duplex mode by selecting one of the following options: 100 Mbps-full, 100 Mbps-half, 10 Mbps-full, or 10 Mbps-half. The data speed field allows the user to set the data speed. By default, this option is auto, as shown in FIG. 16. When negotiating the transmission parameters, the networked devices first share their capabilities and then choose the fastest transmission mode they both support. The change button allows a user to save or test the changes.

Figure 17:
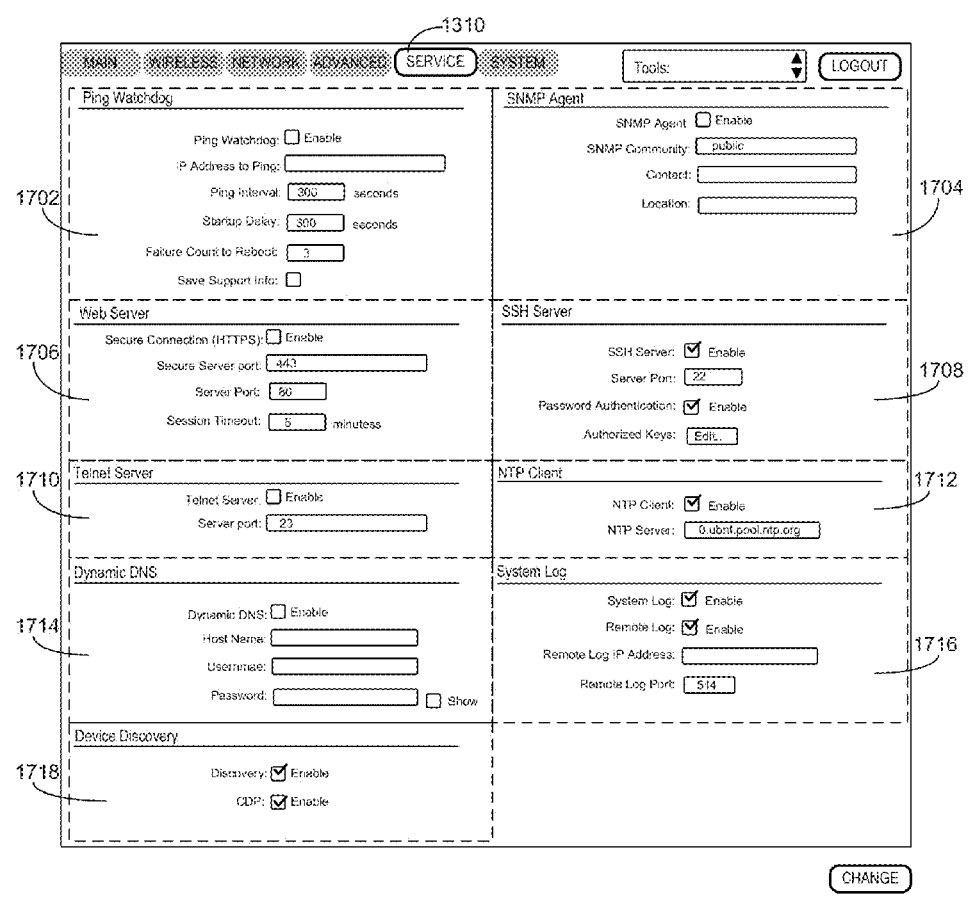

FIG. 17 presents a diagram illustrating an exemplary view of the configuration interface, in accordance with an embodiment of the present invention. As shown in FIG. 17, when services tab 1310 is active, a number of display areas are presented to the user to allow the user to configure system management services, including but not limited to: ping watchdog, SNMP agent, web server, SSH server, Telnet server, NTP client, dynamic DNS, system log, and device discovery. The change button allows the user to save or test the changes.

In some variations, ping watchdog sets the radio to continuously ping a user-defined IP address (it can be the Internet gateway, for example). If it is unable to ping under the user-defined constraints, then the radio will automatically reboot. This option creates a kind of "fail-proof" mechanism. Ping watchdog is dedicated to continuous monitoring of the specific connection to the remote host using the ping tool. The ping tool works by sending ICMP echo request packets to the target host and listening for ICMP echo response replies. If the defined number of replies is not received, the tool reboots the radio. As shown in FIG. 17, a user can enable the ping watchdog option to activate the fields in display area 1702, which include an IP address to ping field, a ping interval field, a startup delay field, a failure count to reboot field, and a save support info option.

The IP address to ping field specifies the IP address of the target to be monitored by the ping watchdog. The ping interval field specifies the time interval (in seconds) between the ICMP echo requests that are sent by the Ping watchdog. The default value is 300 seconds. The startup delay field specifies the initial time delay (in seconds) until the first ICMP echo requests are sent by the ping watchdog. The default value is 300 seconds. The startup delay value should be at least 60 seconds because the network interface and wireless connection initialization takes a considerable amount of time if the radio is rebooted. The failure count to reboot field specifies a number of ICMP echo response replies. If the specified number of ICMP echo response packets is not received continuously, the ping watchdog will reboot the radio. The default value is 3. The save support info option generates a support information file when enabled.

Simple Network Monitor Protocol (SNMP) is an application layer protocol that facilitates the exchange of management information between network devices. Network administrators use SNMP to monitor network-attached devices for issues that warrant attention. The radio includes an SNMP agent, which does the following: provide an interface for device monitoring using SNMP, communicate with SNMP management applications for network provisioning, allow network administrators to monitor network performance and troubleshoot network problems.

In some variations, as shown in FIG. 17, a user can enable the SNMP agent, and the fields in display area 1704, which include SNMP community, contact, and location, are activated. The SNMP community field specifies the SNMP community string. It is required to authenticate access to Management Information Base (MIB) objects and functions as an embedded password. The radio also supports a read-only community string; authorized management stations have read access to all the objects in the MIB except the community strings, but do not have write access. The radio supports SNMP v1. The default SNMP community is public. The contact field specifies the contact that should be notified in case of emergency. The location field specifies the physical location of the radio.

As shown in FIG. 17, configuration options of the web server are displayed in display area 1706, including an option to enable secure connection (HTTPS), a secure server port field (active only when HTTPS is enabled), a server port field, and a session timeout field. When the secure connection is enabled, the web server uses the secure HTTPS mode. When secure HTTPS mode is used, the secure server port field specifies the TCP/IP port of the web server. If the HTTP mode is used, the server port field specifies the TCP/IP port of the web server, as shown in FIG. 17. The session timeout field specifies the maximum timeout before the session expires. Once a session expires, the user needs to log in again using the username and password.

A number of SSH server parameters can be set in display area 1708. The SSH server option enables SSH access to the radio. When SSH is enabled, the server port field specifies the TCP/IP port of the SSH server. When the password authentication option is enabled, the user needs to be authenticated using administrator credentials to gain SSH access to the radio; otherwise, an authorized key is required. A user can click edit in the authorized keys field to import a public key file for SSH access to the radio instead of using an admin password.

The Telnet server parameter can be set in display area 1710. When the Telnet server option is enabled, the system activates Telnet access to the radio, and the server port field specifies the TCP/IP port of the Telnet server.

Network Time Protocol (NTP) is a protocol for synchronizing the clocks of computer systems over packet-switched, variable-latency data networks. One can use it to set the system time on the radio. If the log option is enabled, then the system time is reported next to every log entry that registers a system event. The NTP client parameter can be set in display area 1712. When the NTP client option is enabled, the radio obtains the system time from a time server on the Internet. The NTP server field specifies the IP address or domain name of the NTP server.

Domain Name System (DNS) translates domain names to IP addresses; each DNS server on the Internet holds these mappings in its respective DNS database. Dynamic Domain Name System (DDNS) is a network service that notifies the DNS server in real time of any changes in the radio's IP settings. Even if the radio's IP address changes, one can still access the radio through its domain name. The dynamic DNS parameters can be set in display area 1714. When the dynamic DNS option is enabled, the radio allows communication with the DDNS server. To do so, the user needs to enter the host name of the DDNS server in the host name field, the user name of the DDNS account in the username field, and the password of the DDNS account in the password field. When the box next to the show option is checked, the password characters are shown.

The system log parameters can be set in display area 1716. Enabling the system log option enables the registration routine of system log (syslog) messages. By default it is disabled. When enabled, the remote log option enables the syslog remote sending function. As a result, system log messages are sent to a remote server, which is specified in the remote log IP address and remote log port fields. The remote log IP address field specifies the host IP address that receives the syslog messages. One should properly configure the remote host to receive syslog protocol messages. The remote log port field specifies the TCP/IP port that receives syslog messages. 514 is the default port for the commonly used system message logging utilities, as shown in FIG. 17.

Every logged message contains at least a system time and host name. Usually a specific service name that generates the system event is also specified within the message. Messages from different services have different contexts and different levels of detail. Usually error, warning, or informational system service messages are reported; however, more detailed debug level messages can also be reported. The more detailed the system messages reported, the greater the volume of log messages generated.

The device discovery parameters can be set in display area 1718. More specifically, a user can enable the discovery option in order for the radio to be discovered by other devices through the discovery tool. A user can also enable the Cisco Discovery Protocol (CDP) option, so the radio can send out CDP packets to share its information.

Figure 18:
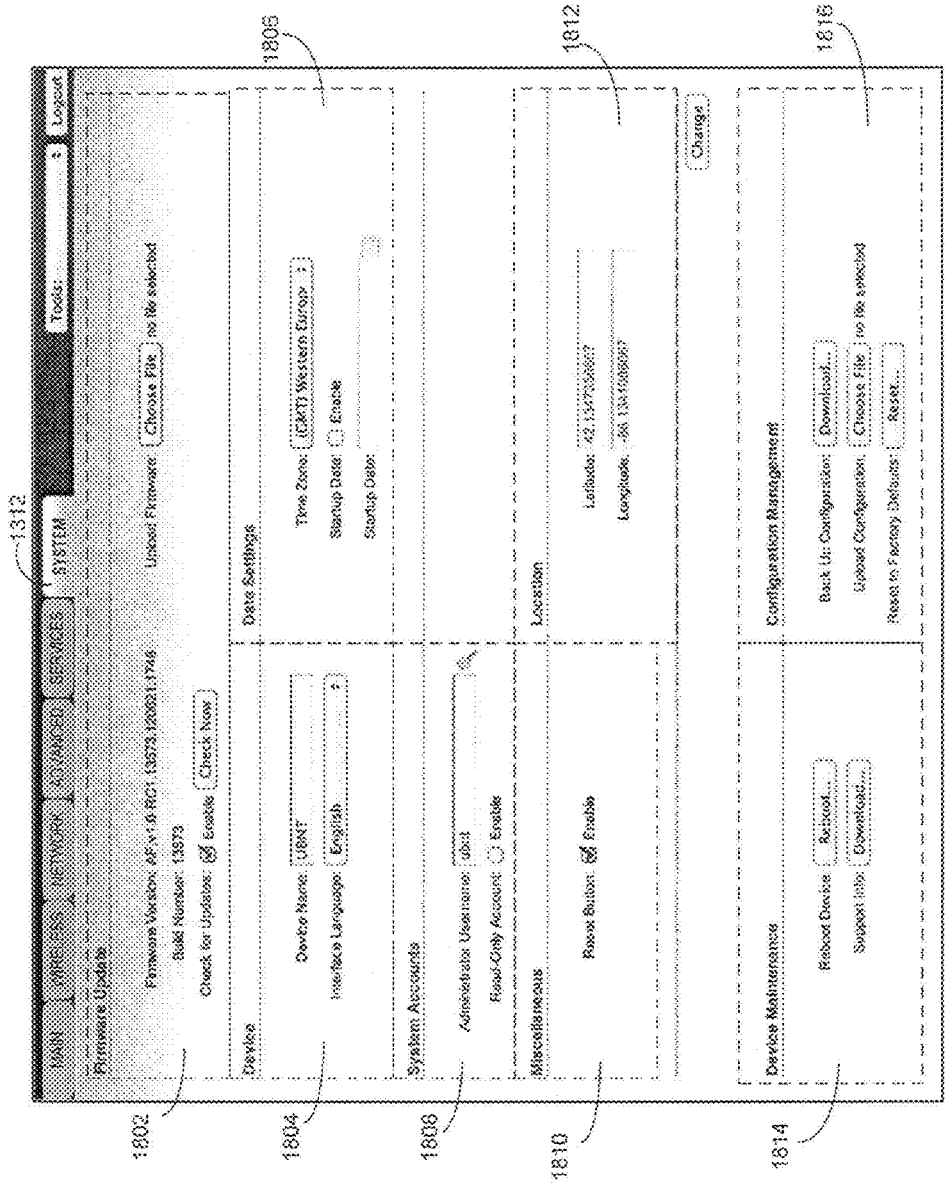
FIG. 18 presents a diagram illustrating an exemplary view of the configuration interface, in accordance with an embodiment of the present invention.

FIG. 18 presents a diagram illustrating an exemplary view of the configuration interface, in accordance with an embodiment of the present invention. As shown in FIG. 18, when system tab 1312 is active, a number of display areas are presented to the user to provide the user with a number of administrative options. More specifically, this page enables the administrator to reboot the radio, reset it to factory defaults, upload new firmware, back up or update the configuration, and configure the administrator account. The change button allows the user to save and test the changes.

The firmware maintenance is managed by the various fields in firmware update display area 1802. The firmware version field displays the current firmware version. The build number field displays the build number of the firmware version. The check for updates option is enabled by default to allow the firmware to automatically check for updates. To manually check for an update, the user can click the check now button. One can click the upload firmware button to update the radio with new firmware. The radio firmware update is compatible with all configuration settings. The system configuration is preserved while the radio is updated with a new firmware version. However, it is recommended that the user backs up the current system configuration before updating the firmware. Updating the firmware is a three-step procedure. First, click the choose file button to locate the new firmware file. In a subsequently appearing window (not shown in FIG. 18), select the file and click open. Second, click the upload button to upload the new firmware to the radio. Third, once the uploaded firmware version is displayed, click the update button to confirm. If the firmware update is in process, the user can close the firmware update window, but this does not cancel the firmware update. The firmware update routine can take three to seven minutes. The radio cannot be accessed until the firmware update routine is completed.

Device display area 1804 displays the device name and the interface language. The device name (host name) is the system-wide device identifier. The SNMP agent reports it to authorized management stations. The device name will be used in popular router operating systems, registration screens, and discovery tools. The interface language field allows a user to select the language displayed in the web management interface. English is the default language.

Data settings display area 1806 displays time zone and startup date. The time zone field specifies the time zone in relation to Greenwich Mean Time (GMT). A user can enable the startup date option to change the radio's startup date. The startup date field specifies the radio's startup date. The user can click the calendar icon or manually enter the date in the following format: MM/DD/YYYY. For example, for Apr. 5, 2012, enter Apr. 5, 2012 in the startup date field.

System accounts display area 1808 allows the user to change the administrator password to protect the device from unauthorized changes. It is recommended that the user changes the default administrator password when initially configuring the device. Note that the read-only account check box enables the read-only account, which can only view the main tab.

Miscellaneous display area 1810 includes a reset button option. Enabling the reset button allows the use of the radio's physical reset button. To prevent an accidental reset to default settings, uncheck the box.

Location display area 1812 includes a latitude field and a longitude field. After the on-board GPS determines the location of the radio, its latitude and longitude are displayed in the respective fields. If the GPS does not have a fix on its location, then "searching for satellites" will be displayed.

Device maintenance display area 1814 enables management of the radio's maintenance routines: reboot and support information reports. When the reboot button is clicked, the configuration interface initiates a full reboot cycle of the radio. Reboot is the same as the hardware reboot, which is similar to the power-off and power-on cycle. The system configuration stays the same after the reboot cycle completes. Any changes that have not been applied are lost. When the support info download button is clicked, the configuration interface generates a support information file that support engineers can use when providing customer support. This file only needs to be generated at the engineers' request.

Configuration management display area 1816 allows a user to manage the radio's configuration routines and provides the option to reset the radio to factory default settings. The radio configuration is stored in a plain text file with a ".cfg" extension. A user can back up, restore, or update the system configuration file. More specifically, a user can back up the configuration file by clicking the download button to download the current system configuration file. To upload a configuration file, one can click the choose file button to locate the new configuration file. On a subsequently appearing screen (not shown in FIG. 18), the user can select the file and click open. It is recommended that one should back up the current system configuration before uploading the new configuration. Once the new file is open, the user can click the upload button to upload the new configuration file to the radio. After the radio is rebooted, the settings of the new configuration are displayed in the wireless, network, advanced, services, and system tabs of the configuration interface. The reset button in the reset to factory defaults field resets the radio to the factory default settings. This option will reboot the radio, and all factory default settings will be restored.

Figure 19:
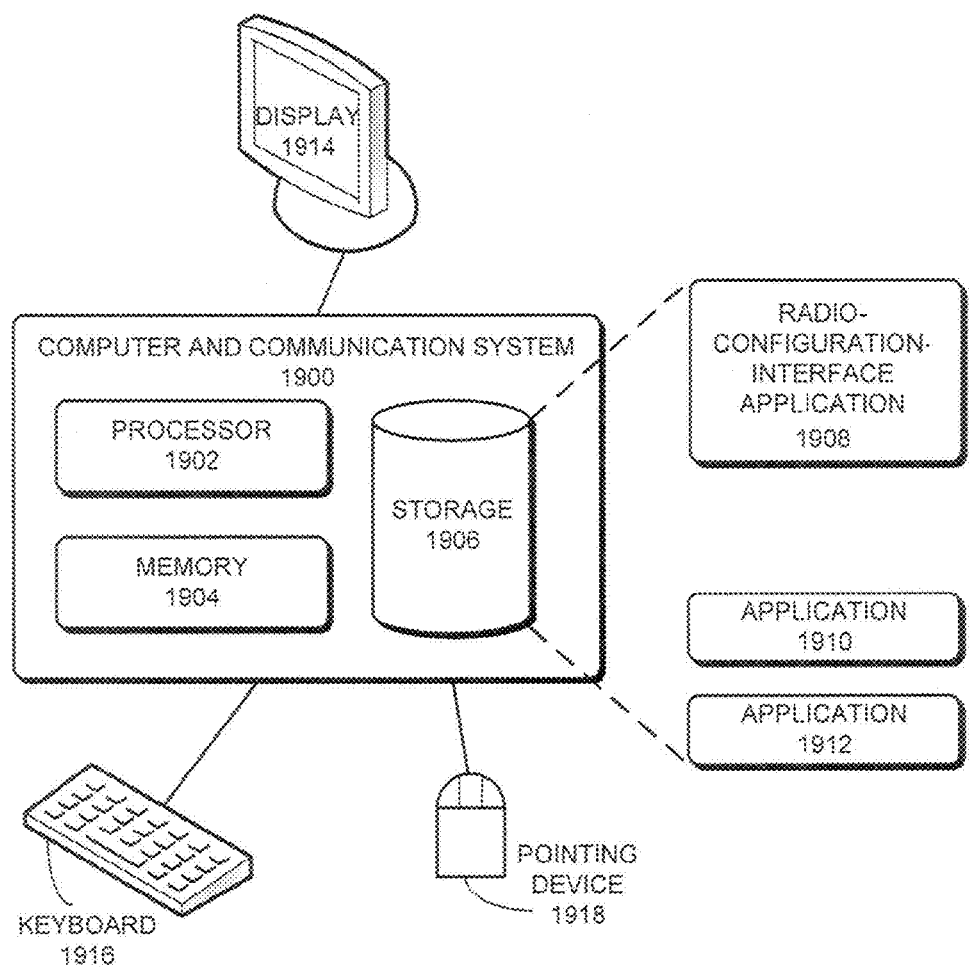
FIG. 19 illustrates an exemplary computer system for implementing the radio-configuration interface of devices, in accordance with one embodiment of the present invention.

FIG. 19 illustrates an exemplary computer system for implementing the radio-configuration interface of devices, in accordance with one embodiment of the present invention. In one embodiment, a computer and communication system 1900 includes a processor 1902, a memory 1904, and a storage device 1906. Storage device 1906 stores a radio-configuration-interface application 1908, as well as other applications, such as applications 1910 and 1912. During operation, radio-configuration-interface application 1908 is loaded from storage device 1906 into memory 1904 and then executed by processor 1902. While executing the program, processor 1902 performs the aforementioned functions. Computer and communication system 1900 is coupled to an optional display 1914, keyboard 1916, and pointing device 1918. The display, keyboard, and pointing device can facilitate the use of the radio-configuration interface.

Examples of System Specifications

FIG. 20 presents a diagram illustrating one variation of the receive sensitivity specifications of the radio for various modulation schemes, in accordance with an embodiment of the present invention. As one can see from FIG. 20, in this example, the higher rate modulations support greater throughput but generally require stronger RF signals (with lower receive sensitivity).

FIG. 21 presents a diagram illustrating one variation of the general specifications of the radio, in accordance with an embodiment of the present invention.

The data structures and code described in this detailed description may be stored on a computer-readable storage medium, which may be any device or medium that can store code and/or data for use by a computer system. In some variations, the computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A radio assembly, comprising:
   an antenna housing unit that houses a pair of parabolic reflectors, wherein the pair of reflectors are situated on a front side of the antenna housing unit, wherein the pair of reflectors include a transmitting reflector having a circular rim that overlaps and truncates a portion of an adjacent receiving reflector which consequently has a partially circular rim;
   wherein the partially circular rim of the receiving reflector has an outer diameter that is larger than that of the circular rim of the transmitting reflector;
   a printed circuit board (PCB) comprising at least a transmitter coupled to the transmitting reflector and a receiver coupled to the receiving reflector, wherein the PCB is situated within a cavity at a backside of the antenna housing unit; and
   a backside cover that covers the cavity, thereby enclosing the PCB within the antenna housing unit.

2. The radio assembly of claim 1, wherein the transmitter is electronically isolated from the receiver.

3. The radio assembly of claim 2, wherein the transmitter and the receiver can be configured to operate in one of:
   a full-duplex mode; and
   a half-duple mode.

4. The radio assembly of claim 1, wherein the pair of reflectors are formed using a single mold.

5. The radio assembly of claim 1, further comprising a pair of feed antennas that are coupled to the transmitter and the receiver.

6. The radio assembly of claim 1, further comprising a mounting unit for mounting the radio assembly onto a pole, wherein the mounting unit is coupled to the backside of the antenna housing unit.

7. The radio assembly of claim 6, wherein the mounting unit includes:
   an azimuth-adjustment mechanism for adjusting the reflectors' azimuth; and
   an elevation-adjustment mechanism for adjusting the reflectors' elevation.

8. The radio assembly of claim 1, wherein the PCB further comprises a field-programmable gate array (FPGA) chip coupled to the transmitter and the receiver.

9. The radio assembly of claim 8, wherein the PCB further comprises a central processing unit (CPU) coupled to the FPGA chip.

10. The radio assembly of claim 8, wherein the PCB further comprises an Ethernet transceiver coupled to the FPGA chip.

11. The radio assembly of claim 1, wherein the PCB further comprises a GPS receiver.

12. The radio assembly of claim 1, wherein the transmitter further comprises a quadrature modulator for modulating transmitted signals.

13. The radio assembly of claim 12, wherein the transmitter further comprises an IQ alignment module for automatic alignment of inphase and quadrature components of transmitted signals.

14. The radio assembly of claim 1, wherein the transmitter and the receiver are configured to operate in a license-free 24 GHz frequency band.

15. A method for forming a radio, comprising:
    placing a pair of parabolic reflectors on a front side of an antenna housing unit, wherein the pair of reflectors include a transmitting reflector having a circular rim that overlaps and truncates a portion of an adjacent receiving reflector which consequently has a partially circular rim, and wherein the partially circular rim of the receiving reflector has an outer diameter that is larger than that of the circular rim of the transmitting reflector;
    placing a printed circuit board (PCB) comprising at least a transmitter coupled to the transmitting reflector and a receiver coupled to the receiving reflector within a cavity at a backside of the antenna housing unit; and
    placing a backside cover over the cavity, thereby enclosing the PCB within the antenna housing unit.

16. The method of claim 15, wherein the transmitter and the receiver are electronically isolated from each other.

17. The method of claim 16, further comprising configuring the transmitter and the receiver to operate in one of:
    a full-duplex mode; and
    a half-duple mode.

18. The method of claim 15, wherein the pair of reflectors are formed using a single mold.

19. The method of claim 15, wherein the transmitter further comprises a quadrature modulator for modulating transmitted signals.

20. The method of claim 19, wherein the transmitter further comprises an IQ alignment module for automatic alignment of inphase and quadrature components of transmitted signals.

* * * * *